(12) United States Patent
Kikuchi et al.

(10) Patent No.: US 7,792,938 B2
(45) Date of Patent: Sep. 7, 2010

(54) DATA DELIVERY APPARATUS AND METHOD, AND TERMINAL APPARATUS

(75) Inventors: Takeshi Kikuchi, Shizuoka-ken (JP); Toshikazu Sato, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 1296 days.

(21) Appl. No.: 11/071,760

(22) Filed: Mar. 3, 2005

(65) Prior Publication Data

US 2005/0214728 A1    Sep. 29, 2005

(30) Foreign Application Priority Data

Mar. 4, 2004  (JP)  ............................. 2004-060976
Mar. 4, 2004  (JP)  ............................. 2004-060977

(51) Int. Cl.
*G06F 15/173* (2006.01)

(52) U.S. Cl. ..................................................... 709/223
(58) Field of Classification Search .................. 709/223
See application file for complete search history.

(56) References Cited

U.S. PATENT DOCUMENTS

| 5,823,788 | A | * | 10/1998 | Lemelson et al. | 434/350 |
| 6,074,216 | A | * | 6/2000 | Cueto | 434/322 |
| 6,149,441 | A | * | 11/2000 | Pellegrino et al. | 434/350 |
| 6,211,451 | B1 |  | 4/2001 | Tohgi et al. | |
| 6,302,698 | B1 | * | 10/2001 | Ziv-El | 434/323 |
| 6,380,470 | B1 | * | 4/2002 | Fujiwara et al. | 84/470 R |

(Continued)

FOREIGN PATENT DOCUMENTS

EP    0 933 749    8/1999

(Continued)

OTHER PUBLICATIONS

European Search Report dated Nov. 14, 2005.

(Continued)

*Primary Examiner*—Vivek Srivastava
*Assistant Examiner*—Minh-Chau Nguyen
(74) *Attorney, Agent, or Firm*—Harness, Dickey & Pierce, PLC

(57) ABSTRACT

Data delivery apparatus communicate with a plurality of terminals via a communication network. Member table stores a member ID and attribute data of each member. When a member logs in via a terminal, its communication address is written into the table in association with its member ID. When a command requesting delivery of particular data has been received from a terminal, the delivery apparatus refers to the table, on the basis of the communication address of the terminal having transmitted the command, to determine whether the attribute data corresponding to the member ID is indicative of a predetermined attribute. If so, the delivery apparatus reads out the particular data from a database and broadcasts the particular data to all of terminal apparatus having their respective communication addresses stored in the table. The delivery apparatus can broadcast data, transmitted from a terminal, to all of the members, with reference to the table. The broadcasted data may be stored in a sharing memory so that the data can be transmitted to another terminal having logged in at a later time. On the basis of performance data generated in response to performance of a musical instrument, an image indicative of the contents of the performance is created and then displayed along with a graphic image emulating the musical instrument.

7 Claims, 21 Drawing Sheets

U.S. PATENT DOCUMENTS

| | | |
|---|---|---|
| 6,660,922 B1 | 12/2003 | Roeder |
| 6,988,138 B1 * | 1/2006 | Alcorn et al. ............... 709/225 |
| 7,043,529 B1 * | 5/2006 | Simonoff .................... 709/205 |
| 2002/0004191 A1 * | 1/2002 | Tice et al. .................... 434/350 |
| 2002/0169826 A1 | 11/2002 | Yano et al. |
| 2003/0051003 A1 * | 3/2003 | Clark et al. ................. 709/218 |
| 2003/0074243 A1 * | 4/2003 | Po ................................ 705/7 |
| 2003/0108000 A1 * | 6/2003 | Chaney et al. .............. 370/260 |
| 2004/0025676 A1 | 2/2004 | Shadd |
| 2004/0131187 A1 * | 7/2004 | Takao et al. ................. 380/255 |
| 2004/0191744 A1 * | 9/2004 | Guirguis .................... 434/322 |

FOREIGN PATENT DOCUMENTS

| | | |
|---|---|---|
| JP | 2000-172161 | 6/2000 |
| JP | 2002-133238 | 5/2002 |
| JP | 2002-323849 | 11/2002 |
| JP | 2003-058031 | 2/2003 |
| JP | 2003-157225 | 5/2003 |
| JP | 2004-037568 | 2/2004 |
| WO | WO 03/034672 | 4/2003 |

OTHER PUBLICATIONS

"RFC 2543 SIP: Session Initiation Protocol".

"Development of a Group Learning System with Chat and Blackboard", Satoshi Fujii and Tadanori Mizuno, pp. 57-63, No. 397, vol. 101 of Institute of Electronics, Information and Communication Engineers Engineering Research report by Intitute of Electronics, Information and Communication Engineers, Oct. 26, 2001, Japan.

* cited by examiner

| AREA NO. | MEMBER ID | ATTRIBUTE | STATE | COMMUNICATION ADDRESS |
|---|---|---|---|---|
| R3 | A | INSTRUCTOR | LOGOUT | |
| R4 | B | STUDENT | LOGOUT | |
| R5 | C | STUDENT | LOGOUT | |
| R6 | D | STUDENT | LOGOUT | |
| R7 | | | | |
F I G. 7
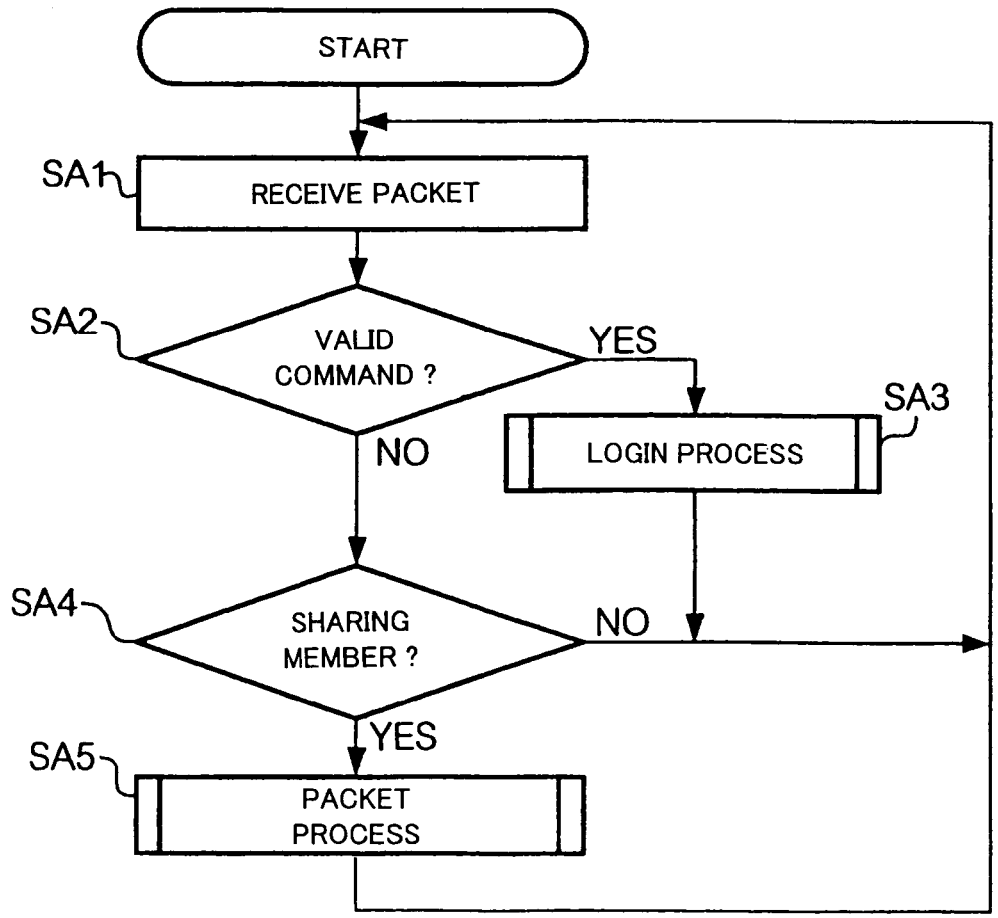
F I G. 8

| AREA NO | MEMBER ID | ATTRIBUTE | STATE | COMMUNICATION ADDRESS |
|---|---|---|---|---|
| R3 | A | INSTRUCTOR | ITSELF | — |
| R4 | B | STUDENT | LOGOUT | |
| R5 | C | STUDENT | LOGOUT | |
| R6 | D | STUDENT | LOGOUT | |
| R7 | | | | |

FIG. 12

| AREA NO. | SELECTION STATE |
|---|---|
| R3 | NON-SELECTED |
| R4 | SELECTED |
| R5 | SELECTED |
| R6 | SELECTED |
| R7 | SELECTED |

FIG. 13

| AREA NO. | MEMBER ID | ATTRIBUTE | STATE | COMMUNICATION ADDRESS |
|---|---|---|---|---|
| R3 | A | INSTRUCTOR | LOGOUT | |
| R4 | B | STUDENT | LOGIN | — |
| R5 | C | STUDENT | LOGOUT | |
| R6 | D | STUDENT | LOGOUT | |
| R7 | | | | |

FIG. 18

| AREA NO. | MEMBER ID | ATTRIBUTE | STATE | COMMUNICATION ADDRESS |
|---|---|---|---|---|
| R3 | A | INSTRUCTOR | LOGOUT | |
| R4 | B | STUDENT | ITSELF | — |
| R5 | C | STUDENT | LOGOUT | |
| R6 | D | STUDENT | LOGOUT | |
| R7 | | | | |

FIG. 19

| AREA NO. | SELECTION STATE |
|---|---|
| R3 | SELECTED |
| R4 | NON-SELECTED |
| R5 | SELECTED |
| R6 | SELECTED |
| R7 | SELECTED |

FIG. 20

DATA DELIVERY APPARATUS AND METHOD, AND TERMINAL APPARATUS

BACKGROUND OF THE INVENTION

The present invention relates to techniques for permitting shared use of data among a plurality of terminals. The present invention also relates to techniques for handling performance data of musical instruments, and more particularly to performance display techniques.

Remote training systems have been proposed for providing musical instrument performance training through shared use of various data among a plurality of terminals via communication networks. For example, Japanese Patent Application Laid-open Publication Nos. 2002-133238 and 2002-323849 disclose systems, where data, such as voices and video images of an instructor, are transmitted to terminals of students (i.e., student terminals) via a network and data, such as voices and video images of students, are transmitted to a terminal of the instructor (instructor terminal) via the network. The instructor terminal disclosed in the latter laid-open publication downloads teaching or training materials, stored in a training center, in accordance with instructions of the instructor and transmits the downloaded training materials to the student in accordance with instructions of the instructor.

In actual musical instrument performance training, an instructor takes out a desired training material (e.g., musical score) and informs the students of the taken-out training material, and the students take out and view the informed training material. If these operations can be simplified, the training efficiency will be significantly enhanced. However, the No. 2002-133238 publication does not even slightly disclose or suggest such simplification of the operations. Also, with the training system disclosed in the 2002-323849 publication, the instructor has to manipulate the instructor terminal to download a desired training material and again manipulate the instructor terminal to transmit the downloaded training material, and thus the burden of the instructor tends to be great.

Further, in the remote training systems disclosed in the above-mentioned publications, the instructor or student terminal, having received the video image data and performance data, not only displays the images represented by the received video image but also supplies the received performance data to a musical instrument connected to the instructor or student terminal. In turn, the musical instrument, having been supplied with the performance data, sounds or audibly generates tones in accordance with the supplied performance data. In piano performance training using any one of the disclosed training systems, viewing the displayed video images allows the instructor to visually check student's performance operation of the piano and the student to visually check instructor's performance operation of the piano. However, because the keyboard and pedal of the piano tend to be hidden behind the hands and foot of the human player, it is not easy to visually ascertain the piano performance operation from the displayed video images.

SUMMARY OF THE INVENTION

In view of the foregoing, it is an object of the present invention to provide a technique which permits sharing of data between a plurality of terminals without imposing burdens on users of the terminals.

It is another object of the present invention to provide a technique which allows performance operation of a musical instrument to be visually checked with an increased ease.

In order to accomplish the above-mentioned objects, the present invention provides an improved data delivery apparatus, which comprises: a member storage section that, for each of members of a group, stores an identifier for identifying the member and attribute data indicative of an attribute of the member; a reception section that receives, via a network, data or command transmitted from a terminal apparatus; a write control section that, when data of an identifier transmitted from a terminal apparatus has been received by the reception section, writes a communication address of the terminal apparatus, having transmitted the identifier, into the member storage section in association with the received identifier; and a broadcast (i.e., multi-address) transmission control section that, when a command requesting delivery of particular data has been received by the reception section, determines whether the attribute data corresponding to the identifier stored in the member storage section in association with a communication address of a terminal apparatus having transmitted the command is indicative of a predetermined attribute, and that, if it has been determined that the attribute data is indicative of the predetermined attribute, transmits, via the network, the particular data to all of terminal apparatus of the group having respective communication addresses thereof stored in the member storage section.

According to the present invention, by some terminal apparatus with a predetermined attribute (e.g., instructor's terminal apparatus in a training system) only transmitting a command requesting delivery of particular data, the particular data is delivered to all of the pre-registered terminal apparatus, including that terminal apparatus, of the group, so that the particular data is shared among all of the pre-registered terminal apparatus of the group. Thus, the present invention permits shared use of data (stationary data) among a plurality of terminal apparatus, without imposing a burden on respective users of the terminal apparatus. Further, because the sharing of the particular data is led by a member having the predetermined attribute (i.e., instructor), the basic principles of the present invention are suited for use in a training system where sharing of a training material should be led by an instructor.

In one embodiment of the present invention, the data delivery apparatus may further comprise: a data-writable sharing storage section; a write control section that, when the command requesting delivery of particular data has been received by the reception section, determines whether the attribute data corresponding to the identifier stored in the member storage section in association with the communication address of the terminal apparatus having transmitted the command is indicative of a predetermined attribute, and that, if it has been determined that the attribute data is indicative of the predetermined attribute, writes the particular data into the sharing storage section; and a follow-causing transmission section that, when data of an identifier transmitted from a terminal apparatus has been received by the reception section, determines whether any data is currently written in the sharing storage section, and, if it has been determined that data is currently written in the sharing storage section, transmits the data written in the sharing storage section to a terminal apparatus having a communication address stored in the sharing storage section in association with the received data of the identifier.

Namely, in the data delivery apparatus of the invention, data (stationary data) to be shared (i.e., to-be-shared data) is stored in the sharing storage section, so that the to-be-shared data can be automatically delivered to one, having become a member of the group at a later time, when that member has logged in by transmitting its ID.

In one embodiment of the present invention, the data delivery apparatus may further comprise: a broadcast transfer section that, when data to be transmitted from a terminal apparatus to another terminal apparatus has been received by the reception section, transmits, via the network, the received data to all of terminal apparatus of the group having respective communication addresses thereof stored in the member storage section.

According to the present invention, by some terminal apparatus only transmitting, to the data delivery apparatus, data (dynamic data) that is to be transmitted from that terminal to another terminal, the particular data can be automatically broadcasted to all of the pre-registered terminal apparatus of the group. Thus, the present invention permits shared use of data (dynamic data) among a plurality of terminal apparatus, without imposing a burden on the respective users of the terminal apparatus.

In one embodiment of the present invention, the data delivery apparatus may further comprise: a data-writable sharing storage section; a dynamic write control section that, when data to be transmitted to another terminal apparatus has been received by the reception section, writes the received data into the sharing storage section; and a follow-causing transmission section that, when data of an identifier transmitted from a terminal apparatus has been received by the reception section, determines whether any data is currently written in the sharing storage section, and, if it has been determined that data is currently written in the sharing storage section, transmits the data written in the sharing storage section to a terminal apparatus having a communication address thereof stored in the sharing storage section in association with the received data of the identifier.

Namely, in the delivery apparatus, data (dynamic data) to be transmitted to a terminal apparatus is stored in the sharing storage section as to-be-shared data, so that the to-be-shared data can be automatically delivered to one, having become a member of the group at a later time, when that member has logged in by transmitting its ID. Thus, particular data (stationary data) within the delivery apparatus or data (dynamic data) transmitted from some terminal apparatus can be readily shared among a plurality of terminal apparatus, irrespective of when their communication addresses were associated therewith, without imposing a burden on the users of the terminal apparatus of the same group.

According another aspect of the present invention, there is provided a performance displaying terminal apparatus, which comprises: an input section that inputs performance data generated in response to a performance of a musical instrument; an image creation section that, on the basis of the performance data inputted via the input section, creates an image representative of contents of the performance, along with a graphic image emulating a musical instrument; and a display section that displays the images created by the image creation section.

According still another aspect of the present invention, there is provided a performance displaying system, which comprises: a first terminal apparatus that inputs performance data generated in response to a performance of a musical instrument and transmits the inputted performance data; and a second terminal apparatus that receives the performance data transmitted from the first terminal apparatus and, on the basis of the received performance data, creates an image representative of contents of the performance, along with a graphic image emulating a musical instrument. In this case, the second terminal apparatus may also transmit data of the created images to a communication network.

According to the present invention, which is arranged to display images representing performance contents of performance data using a graphic image (i.e., pictorial image) emulating a musical instrument, an operating state when the musical instrument has been actually played can be visually checked or ascertained with an increased ease. Therefore, if the inventive arrangements are employed as a terminal apparatus of a training system, they allow the user to visually ascertain, with ease, an operating state when the musical instrument has been actually played by an instructor or student, which is therefore very advantageous.

Generally, performance data output from a musical instrument also include data that are not used for creation of the above-mentioned images. However, in the above-discussed prior art system, the performance data output from the musical instrument would undesirably be transmitted via the network as is. In an embodiment of the present invention, however, of the performance data generated in response to a performance of the musical instrument, only a portion, necessary for creation of images indicative of the contents of the performance, is transmitted without the remaining performance data being transmitted. In this way, the present invention prevents transmission of the remaining portion of the performance data, which is not used for image creation, and thus can avoid wasteful transmission.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 7 is a diagram schematically showing example contents of a member table provided in the delivery apparatus;

FIG. 8 is a flow chart showing a flow of operations performed by the delivery apparatus;

FIG. 12 is a diagram schematically showing an example of a correspondency table provided in the instructor terminal;

FIG. 13 is a diagram schematically showing an example of a selection table provided in the instructor terminal;

FIG. 18 is a diagram schematically showing an example of the member table provided in the delivery apparatus;

FIG. 19 is a diagram schematically showing an example of a correspondency table provided in a student terminal in the training system of the present invention;

FIG. 20 is a diagram schematically showing an example of a selection table provided in the student terminal in the training system of the present invention;

DETAILED DESCRIPTION OF THE INVENTION

First Embodiment

Figure 1:
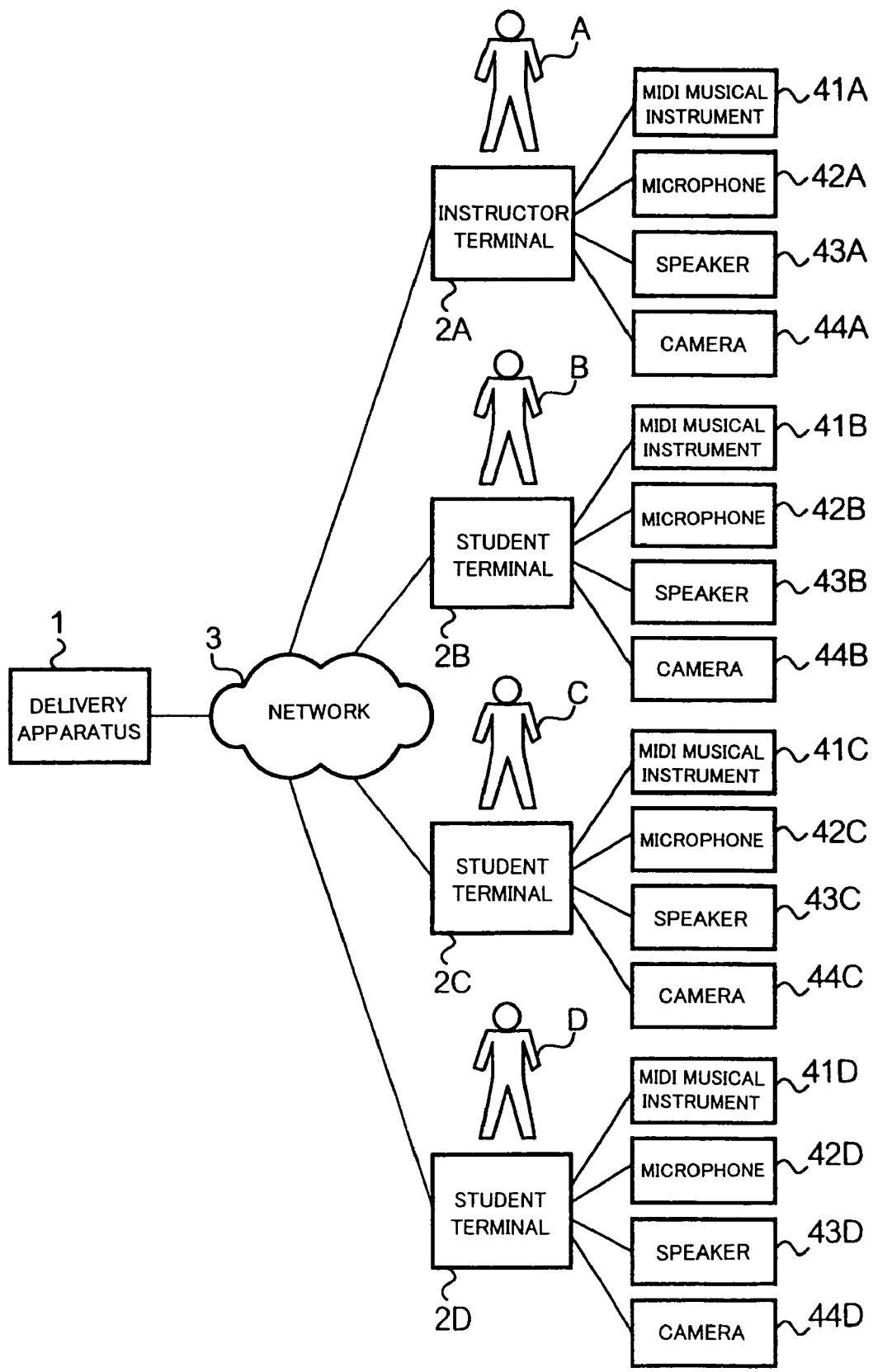
FIG. 1 is a block diagram showing an example general setup of a remote training system in accordance with a first embodiment of the present invention.

1. General Setup:

FIG. 1 is a block diagram showing an example general setup of a remote training system in accordance with a first embodiment of the present invention.

The remote training system of FIG. 1 includes a delivery apparatus 1 for providing a virtual classroom (hereinafter referred to simply as "classroom") to carry out musical instrument performance training, an instructor terminal 2A to be used by an instructor A logging into the classroom to provide the musical instrument performance training, and student terminals 2B-2D to be used by students logging into the classroom to receive the musical instrument performance training. The delivery apparatus 1, instructor terminal 2A and student terminals 2B-2D are each in the form of a computer and connected to a network 3. The network 3 is a packet communication network, and the delivery apparatus 1, instructor terminal 2A and student terminals 2B-2D can transmit/receive (i.e., communicate) packets using the network 3. Further, although not specifically shown, a DNS (Domain Name System) server is connected to the network 3; the DNS server receives respective URLs (Uniform Resource Locators) from the student terminals 2B-2D and returns communication addresses, corresponding to the domain names in the received URLs, to the student terminals.

The predetermined URLs to be used for logging into the classroom are assigned in advance to the instructor A and students B-D. Also, the instructor A and students B-D are assigned in advance unique member identifiers (hereinafter referred to as "IDs"). The member ID is information for identifying a member that is allowed to log into the classroom; specifically, the instructor A is assigned member ID "A", and the students B-D are assigned member ID "B"-"D", respectively. In the following description, the instructor A is also called "member A", the student B "member B", the student C "member C", the student D "member D", and the instructor terminal 2A and student terminals 2B-2D are generically called "terminal 2", as may be necessary.

To the instructor terminal 2A are connected a MIDI musical instrument 41A, microphone 42A, speaker 43A and camera 44A.

Figure 2:
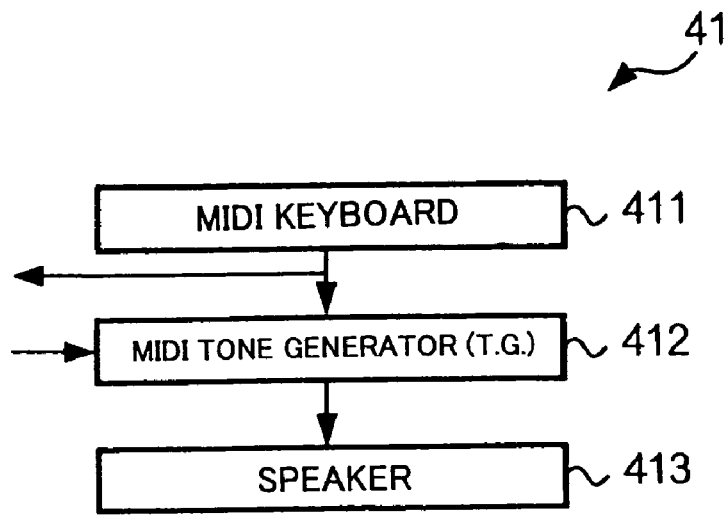
FIG. 2 is a block diagram showing an example general structure of a MIDI musical instrument employed in the training system of the present invention.

The MIDI musical instrument 41A is a keyboard musical instrument compliant with the MIDI (Musical Instrument Digital Interface), and, as illustrated in FIG. 2, the MIDI musical instrument 41A includes a MIDI keyboard 411, a MIDI tone generator (T.G.) 412 and a speaker 413. The MIDI keyboard 411 includes a keyboard, pedal and various other operators. Once any one of the operators is operated by the instructor or member A, the MIDI keyboard 411 generates MIDI data and supplies the MIDI data to the MIDI tone generator 412.

The MIDI tone generator 412 generates a tone signal in accordance with the supplied MIDI data, and, if the MIDI data is one for setting a tone color, sets the tone color in accordance with the supplied MIDI data. The above-mentioned "other" operators are operable to set the MIDI tone generator 412. The speaker 413 audibly generates a tone in accordance with the tone signal generated by the MIDI tone generator 412.

The MIDI musical instrument 41A not only supplies the instructor terminal 2A with the MIDI data generated by the MIDI keyboard 411, but also supplies the MIDI tone generator 412 with the MIDI data supplied from the instructor terminal 2A.

The microphone 42A picks up voices of member A and supplies each of the picked-up voices to the instructor terminal 2A as voice data. The speaker 43A audibly generates a voice in accordance with the voice data supplied from the instructor terminal 2A. The camera 44A images member A at predetermined time intervals and supplies the instructor terminal 2A with image data representative of member A.

The microphones 42B-42D, speakers 43B-43D and cameras 44B-44D, connected to the student terminals 2B-2D, are constructed in a similar manner to those connected to the instructor terminal 2A. In the following description, the MIDI musical instruments 41A-41D will be generically referred to as "MIDI musical instrument 41", the microphones 42A-42D as "microphones 42", the speakers 43A-43D as "speakers 43", and the cameras 44A-44D as "cameras 44".

Figure 3:
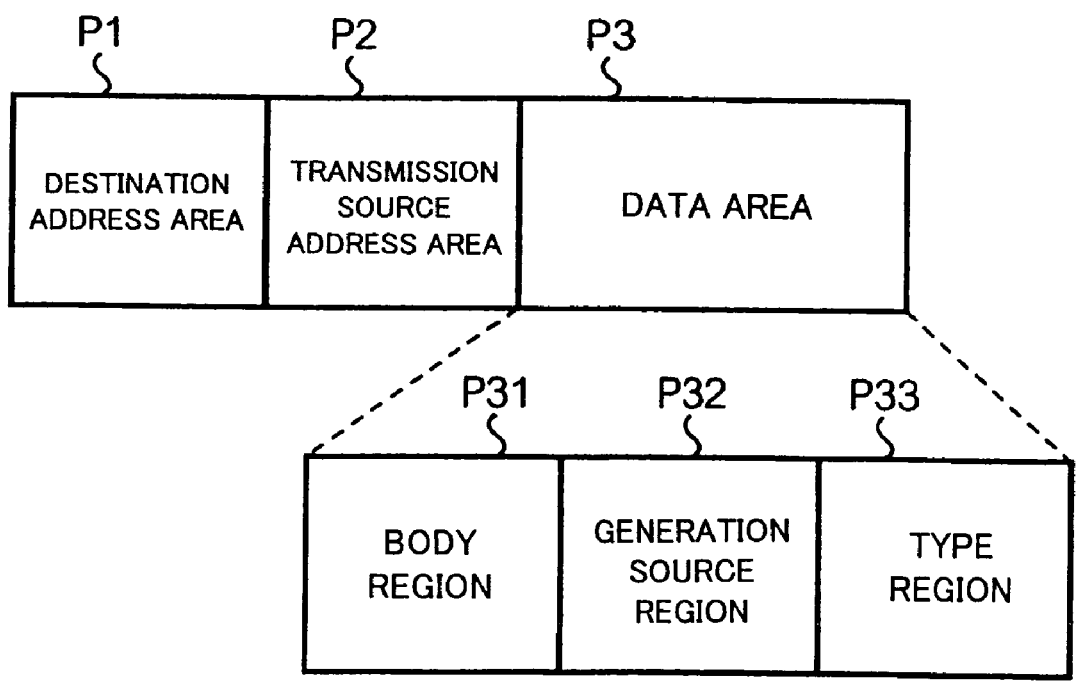
FIG. 3 is a diagram showing an example data organization of a packet employed in the training system of the present invention.

1-1. Packet:

FIG. 3 is a diagram schematically showing a data format or organization of a packet communicated via the network 3. As shown, the packet includes a destination address area P1 for storing a communication address of a transmission destination (i.e., transmitted-to) apparatus, a transmission source address area P2 for storing a communication address of a transmission source (i.e., transmitted-from) apparatus, and a data area P3 for storing the body of data carried by the patch. In the data area P3, there is stored any of training material data, image data, performance data and command.

The training material data is data representative of the contents and status of use of a training material, such as a musical score. Among various examples of data delivered at the time of training in the system are data prestored in a database or memory in the delivery apparatus 1 (hereinafter referred to as "stationary data"), data generated or varied during training (hereinafter referred to as "dynamic data"). Examples of the training material data also include such stationary data and dynamic data.

The voice data is data supplied from the microphone 42 to the terminal 2 and represents a voice of a corresponding one of members A-D. For example, the voice data representative of a voice of member A is data supplied from the microphone 42A to the instructor terminal 2A. Note that all of the voice data are "dynamic data".

The image data is data supplied from the camera 44 to the terminal 2 and visually represents an image of a corresponding one of members A-D. For example, the image data representative of an image of member A is data supplied from the camera 44A to the instructor terminal 2A. Note that all of the image data are "dynamic data".

The performance data is data representative of performance operation of the MIDI musical instrument. For example, the performance data of the MIDI musical instrument 41A is data created by associating time data with MIDI data supplied from the MIDI musical instrument 41A to the instructor terminal 2A. Note that all of the performance data are "dynamic data". Example manner in which such performance data is generated and stored will be described below with reference to FIG. 4.

Figure 4:
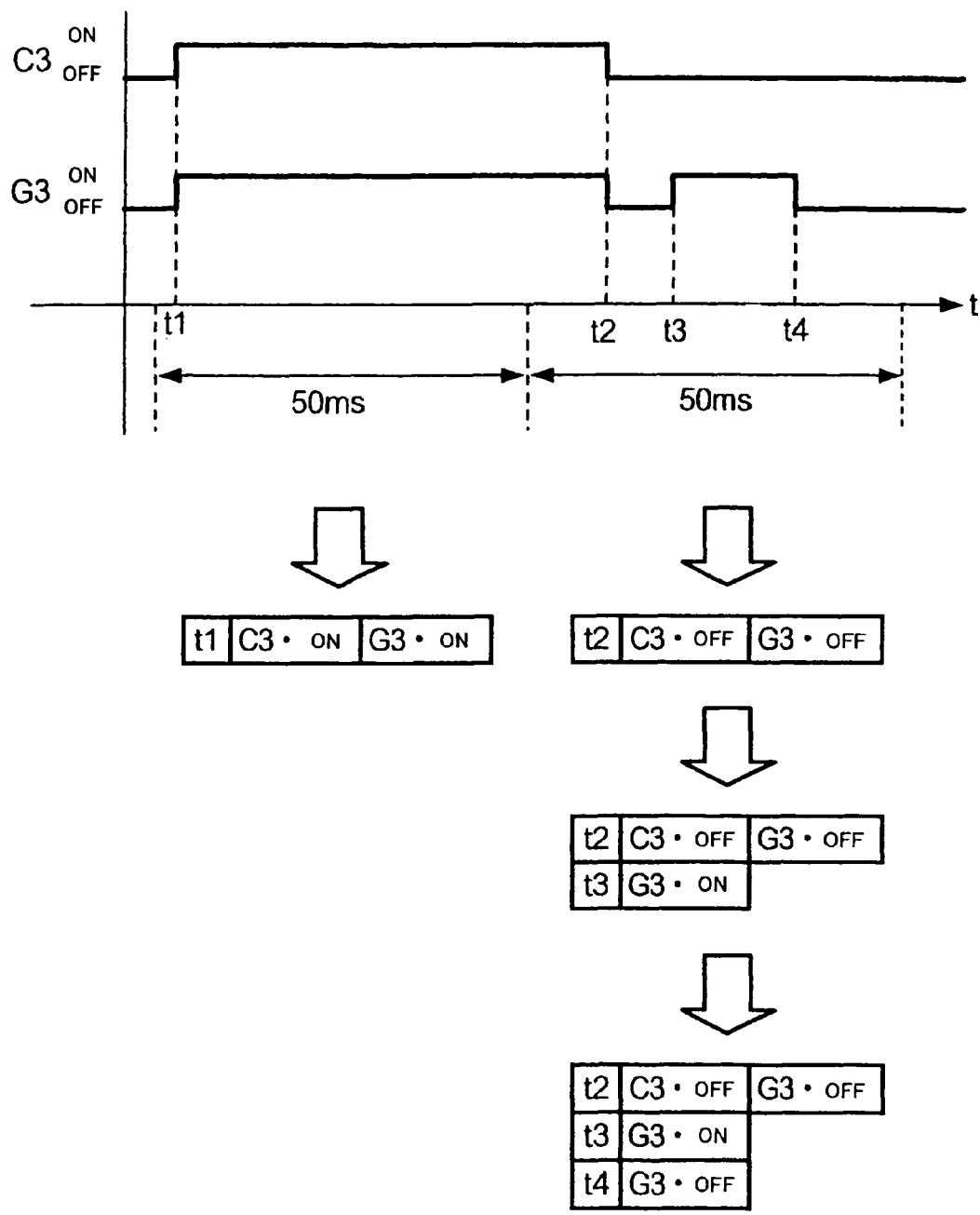
FIG. 4 is a block diagram showing an example manner in which performance data employed in the training system of the present invention are generated.

In the illustrated example of FIG. 4, notes of C3 and G3 are turned on at time point t1 and turned off at time point t2. Then, a note of G3 is turned on at time point t3 and turned off at time point t4. In the instant embodiment, performance data generated successively are packeted per preset acquisition time (e.g., 50 ms). "t1" is a time point within the first acquisition time, and "t2"-"t4" are time points within the second acquisition time following the first acquisition time.

In the illustrated example, one performance data is generated within the first acquisition time. This performance data comprises a combination of MIDI data indicating that the notes of C3 and G3 have been turned on and time data indicative of time point t1, and the performance data generated within the first acquisition time is stored into a single packet. Note that the MIDI data indicative of a note-on event also contains data indicative of a key depression intensity (velocity).

Three performance data are generated within the second acquisition time. The first one of the three performance data comprises a combination of MIDI data indicating that the notes of C3 and G3 have been turned off and time data indicative of time point t2, the second one of the three performance data comprises a combination of MIDI data indicating that the note of G3 has been turned on and time data indicative of time point t3, and the third one of the three performance data comprises MIDI data indicating that the note of G3 has been turned off and time data indicative of time point t4. These three performance data are stored together into one packet.

The command is generated by the delivery apparatus 1 or terminal 2. Among examples of the command generated by the terminal 2 are a login command, training material delivery command, mode change command and logout command. Among examples of the command generated by the delivery apparatus 1 are a login notification command, sharing state notification command and image delivery command.

The login command is a command for requesting a login to the classroom, and it comprises a URL and member ID. The training material delivery command is a command for requesting delivery of training material data.

The mode change command is a command for requesting a change in a performance data delivery mode. Among examples of the performance data delivery mode employed in the instant embodiment are a sharing mode in which performance data from any one of the student terminals 2B-2D is shared among all of the terminals 2, and an individual mode in which performance data from any one of the student terminals 2B-2D is transmitted only to the instructor terminal 2A. The logout command is a command for requesting a logout from the class room, and it includes a URL.

Further, the login notification command is a command for informing that a login to the classroom has been made successfully, and it includes the member ID of the member having succeeded in the login. The image delivery command is a command including training screen data 132 to be later described in detail.

As illustrated in FIG. 3, the data area P3 of the packet is composed of a body region P31 for storing the body of the data, generation source region P32 for storing the member ID indicative of a generation source having generated the data body, and a type region P33 for storing type data indicative of the type of the data body. For example, performance data that is indicative of the contents of performance operation of the MIDI musical instrument 41A is stored in the body region P31 of the packet carrying the performance data, member ID "A" is stored in the generation source region P32, and type data indicating that the data in question is performance data is stored in the type region P33.

Figure 5:
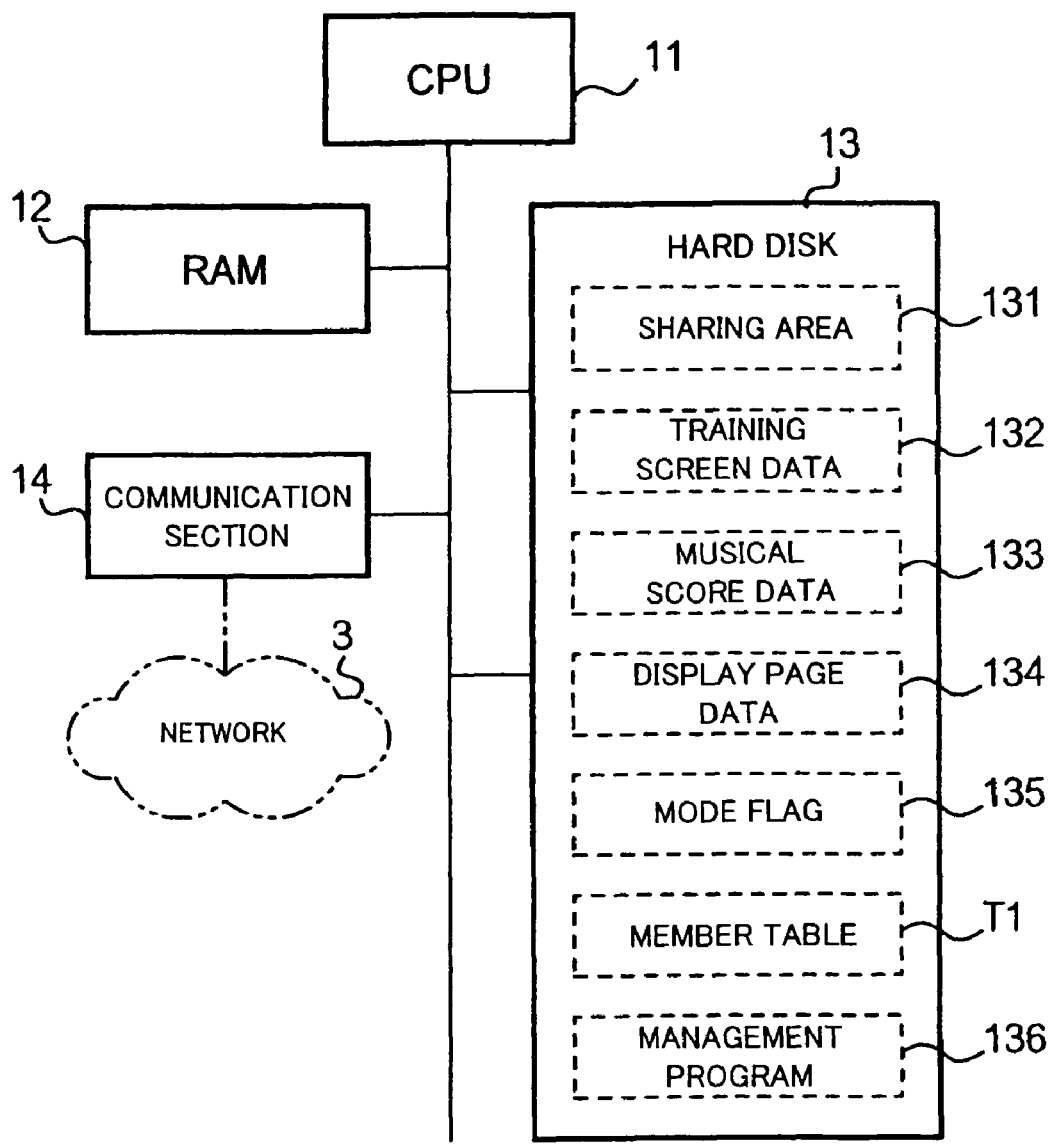
FIG. 5 is a block diagram showing an example general setup of a delivery apparatus in the training system of the present invention.

1-2. Delivery Apparatus:

FIG. 5 is a block diagram showing an example general setup of the delivery apparatus 1.

As shown, the delivery apparatus 1 includes a CPU (Central Processing Unit) 11, a RAM (Random Access Memory) 12, a hard disk 13, and a communication section 14. The communication section 14 relays a packet between the CPU 11 and the network 3.

The hard disk 13 has a sharing area 131 where follow-causing data is stored. The "follow-causing data" is training data or MIDI data to be shared among sharing members, and it is used to cause environments (i.e., stored contents of the terminal 2 and settings of the corresponding MIDI tone generator 412) of a new logged-in member to follow environments of an earlier logged-in member. The "sharing member" means a current logged-in member in the classroom. In the following description, each of the members which is capable of logging into the classroom but, currently, is not the sharing member, will be referred to as "non-sharing member".

Further, in the hard disk 13, there are written training screen data 132, musical score data 133 (stationary data), display page data 134 (stationary data), mode flag 135, member table T1 and management program 136.

Figure 6:
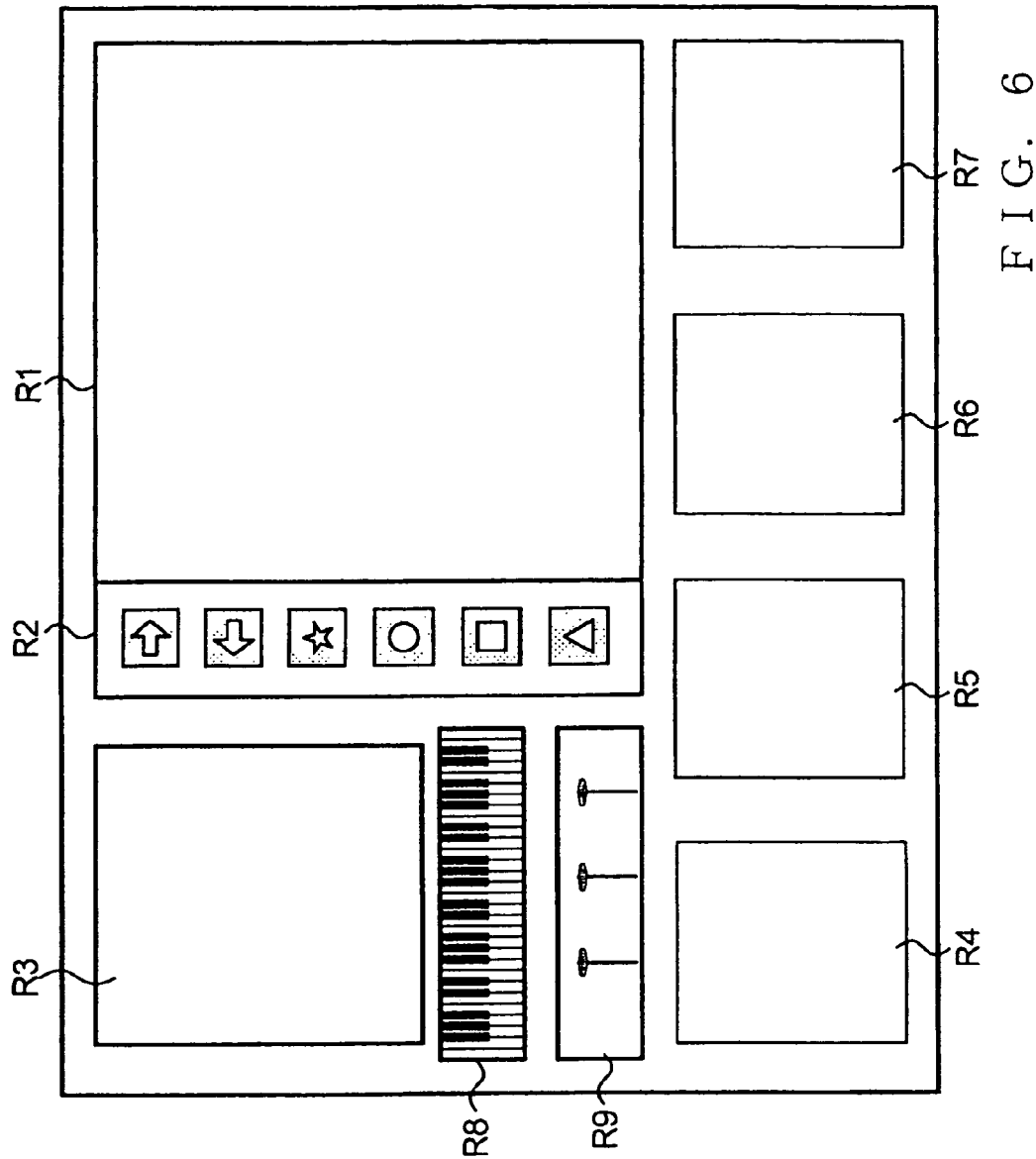
FIG. 6 is a diagram showing a screen displayed on the basis of training screen data employed in the training system of the present invention.

The training screen data 132 is data representative of a training screen to be viewed by the members A-D. As illustrated in FIG. 6, the training screen has various display areas R1-R9. The display area R1 is an area to be used for displaying the contents of a musical score, and the display area R2 is an area to be used for displaying various tools. The "various tools" include a button operable to enter an instruction for downloading training data necessary for the training, a button operable to enter an instruction for turning the pages of a musical score, a button operable to write a text and/or graphic image (i.e., pictorial image) onto the musical score, etc. The display area R3 is an area to be used for displaying an image of the instructor A. The display areas R4-R7 are areas to be used for displaying respective images of the students B-D. The display area R8 is an area to be used for displaying the contents of operation of the keyboard. Further, the display area R9 is an area to be used for displaying the contents of operation of the pedal.

The musical score data 133 is training material data indicative of the contents of a musical score, and the display page data 134 is training material data indicative of a page of the musical score. The mode flag 135 is data indicative of a currently-selected performance data delivery mode (sharing mode or individual mode) in which the performance data is to be delivered; at an initial stage, the mode flag 135 indicates the sharing mode.

The member table T1 is a table in which members A-D are associated with the display areas R3-R7 of the training screen; specifically, the association is made by associating the member IDs "A"-"D" with unique area numbers "R3"-"R7" of the display areas R3-R7. More specifically, as illustrated in FIG. 7, the member ID "A" is associated with the area number "R3", the member ID "B" the area number "R4", the member ID "C" the area number "R5", and the member ID "D" the area number "R6".

The member table T1 also stores information of the members, and the information of each of the members includes the member ID, attribute (i.e., "instructor" or "student") of the member, state (i.e., "login" or "logout") of the member and the communication address of the terminal 2 used by that member. Initial values of the member table T1 are shown by way of example in FIG. 7. As the information of member A, for example, the member ID "A", member attribute "instructor" and member state "logout" are stored in the member table T1 of FIG. 7. The reason why no communication address is stored for members A-D in the illustrated example of FIG. 7 is that each of these members A-D is in the "logout" state.

Figure 9:
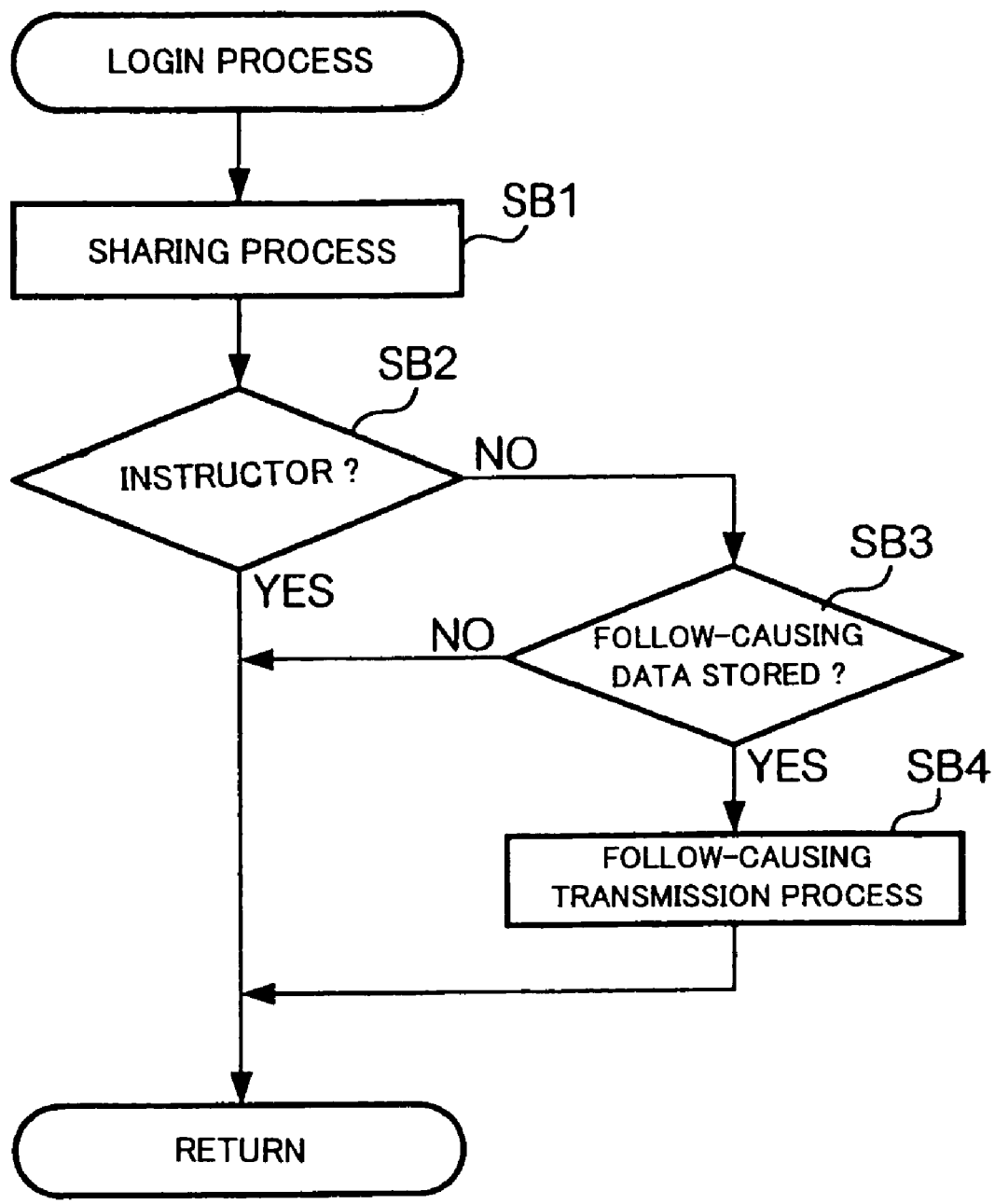
FIG. 9 is a flow chart showing a flow of operations performed by the delivery apparatus.
Figure 10:
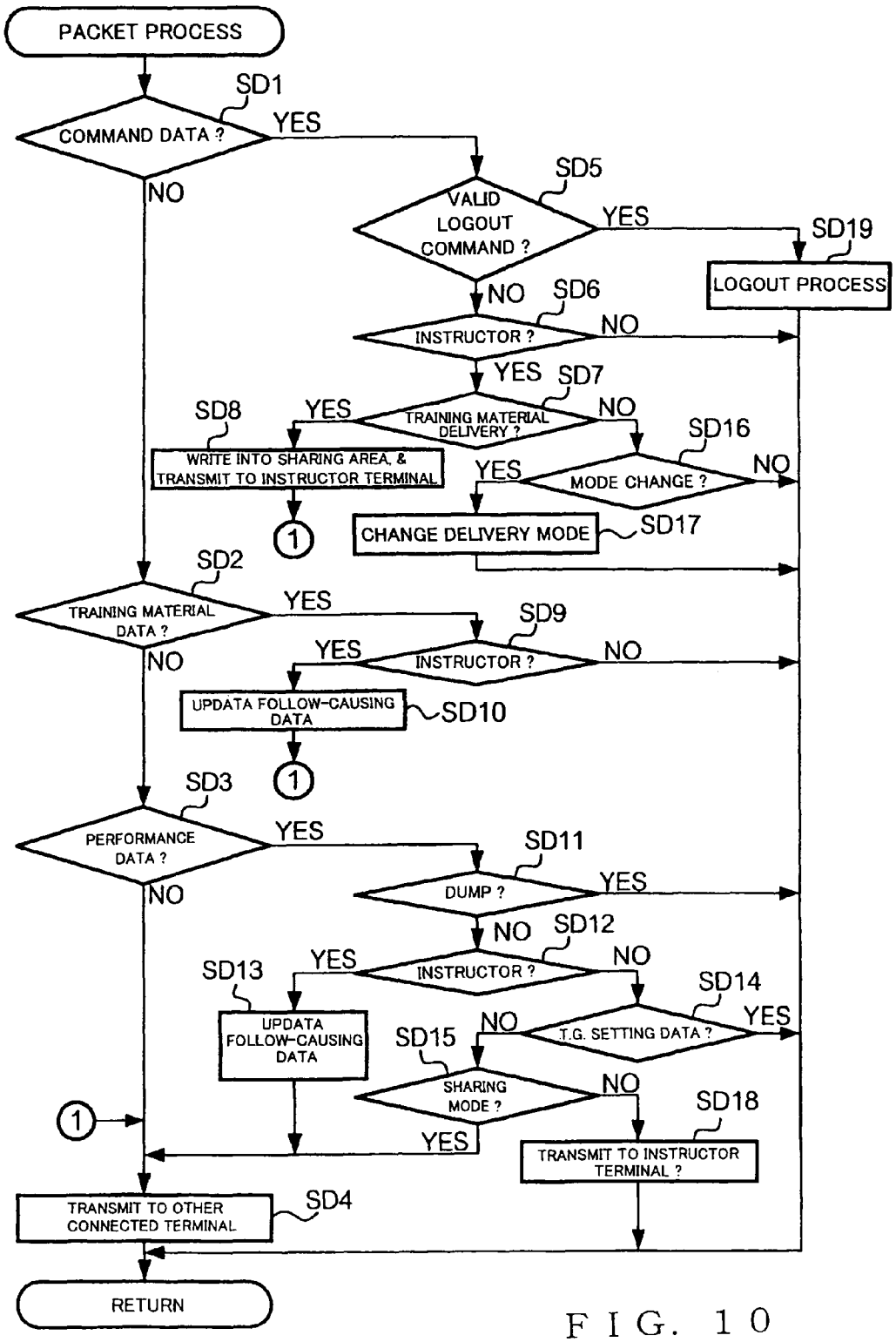
FIG. 10 is a flow chart showing a flow of operations performed by the delivery apparatus.

The management program 136 is a program for causing the CPU 11 of the delivery apparatus 1 to perform operations to be later described in detail. Once a power supply (not shown) is turned on, the CPU 11 reads out and executes the management program 136, during which time the RAM 12 is used as a working area of the CPU 11. Part of the operations performed by the CPU 11 is shown in FIGS. 8-10.

Figure 11:
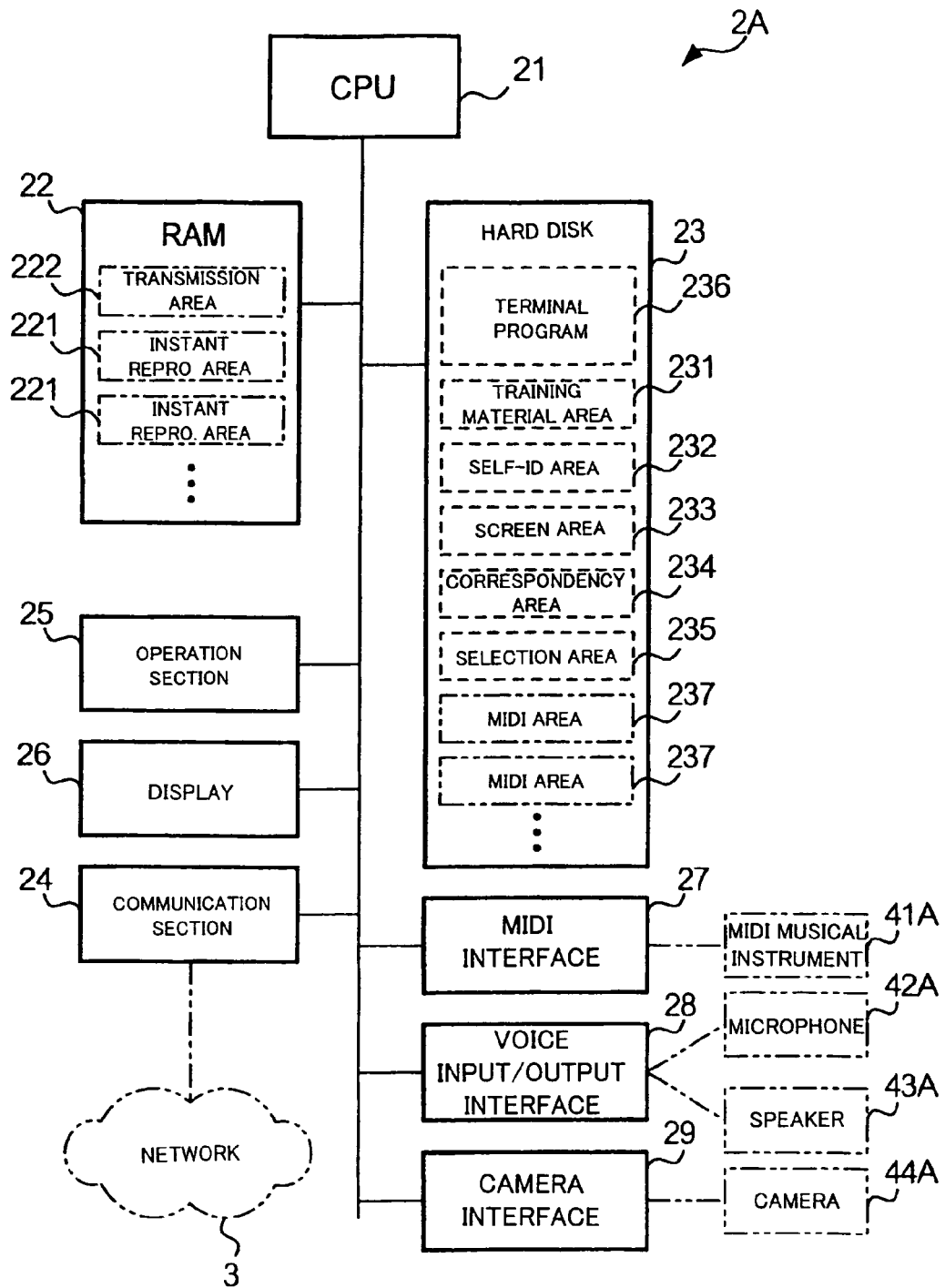
FIG. 11 is a block diagram showing an example general setup of an instructor terminal in the training system of the present invention.

1-3. Terminal:

FIG. 11 is a block diagram showing an example general setup of the instructor terminal 2A. As shown, the instructor terminal 2A includes a CPU 21, a RAM 22, a hard disk 23, a communication section 24, an operation section 25, a display 26, a MIDI interface 27, a voice input/output interface 28, and a camera interface 29.

The communication section 14 relays a packet between the CPU 11 and the network 3. The operation section 25 is operable by the instructor or member A, and it supplies the CPU 21 with an operation signal corresponding to the operation thereof by member A. Member A can enter various instructions into the instructor terminal 2A by operating the operation section 25. The CPU 21 receives the operation signal from the operation section 25 and identifies the instruction entered into the instructor terminal 2A by member A.

The display 26 includes a frame memory and displays an image using image data written in the frame memory. Such display is carried out repetitively at predetermined time intervals. The MIDI interface 27 relays MIDI data to and from the MIDI musical instrument 41A.

The voice input/output interface 28 relays voice data from the microphone 42A to the CPU 21 and relays voice data from the CPU 21 to the speaker 43A. The camera interface 29 relays image data from the cameral 44A to the CPU 21.

In the RAM 22, there are provided a transmission area 222 to be used for transmission of performance data, and instant reproduction areas 221 for temporarily storing received performance data. Such an instant reproduction area 221 is provided for each of the members except member A (i.e., for each of members B, C and D).

In the hard disk 23, there are provided a training material area 231, self-ID area 232, screen area 233, correspondency area 234 and selection area 235. The training material area 231 is an area in which training material data is written, and the self-ID area 232 is an area in which the member ID "A" of member A is written. The screen area 233 is an area in which training screen data is written, the correspondency area 234 is an area in which a later-described correspondency table T2 is written, and the selection area 235 is an area in which a later-described selection table T3 is written.

The correspondency table T2 is a table associating members A-D with the display areas R3-R7 of the training screen, As illustrated in FIG. 12, the correspondency table T2 stores data similar to those stored in the above-described member table T1. However, in the correspondency table T2 of FIG. 12, the state of member A is recorded as "itself" rather than "login" or "logout".

The selection table T3 is a data table indicating selection states of the display areas R3-R7, where, as illustrated in FIG. 13, the area numbers "R3"-"R7" of the display areas R3-R7 are stored in association with selection states, i.e. "selected" and "non-selected" states, of the display areas R3-R7.

Further, in the hard disk 23, there are provided MIDI areas 237 for ultimately storing received performance data. One such MIDI area 237 is provided for each of the members except for member A (i.e., for each of members B, C and D).

Figure 14:
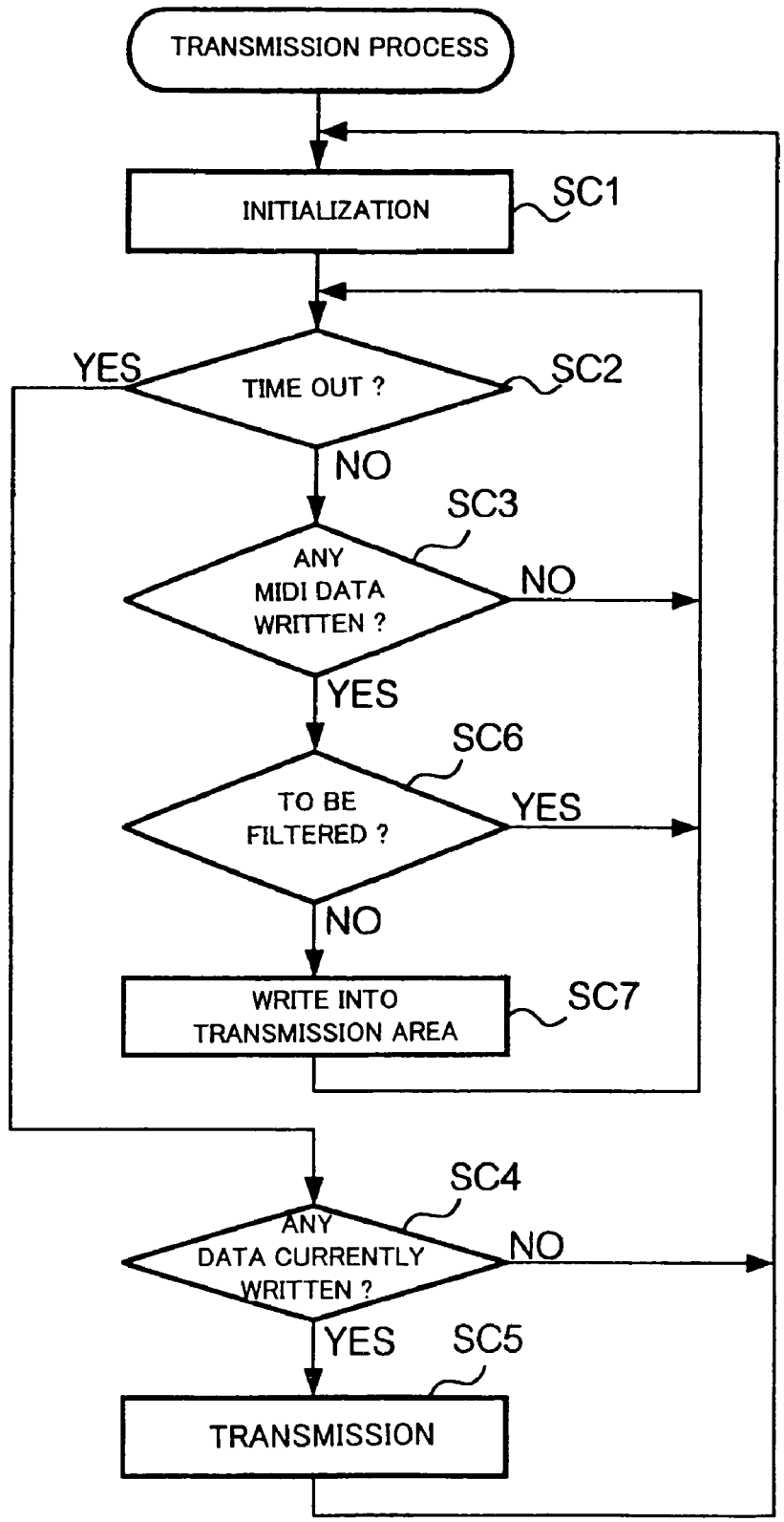
FIG. 14 is a flow chart showing a flow of operations performed by a terminal in the training system of the present invention.
Figure 15:
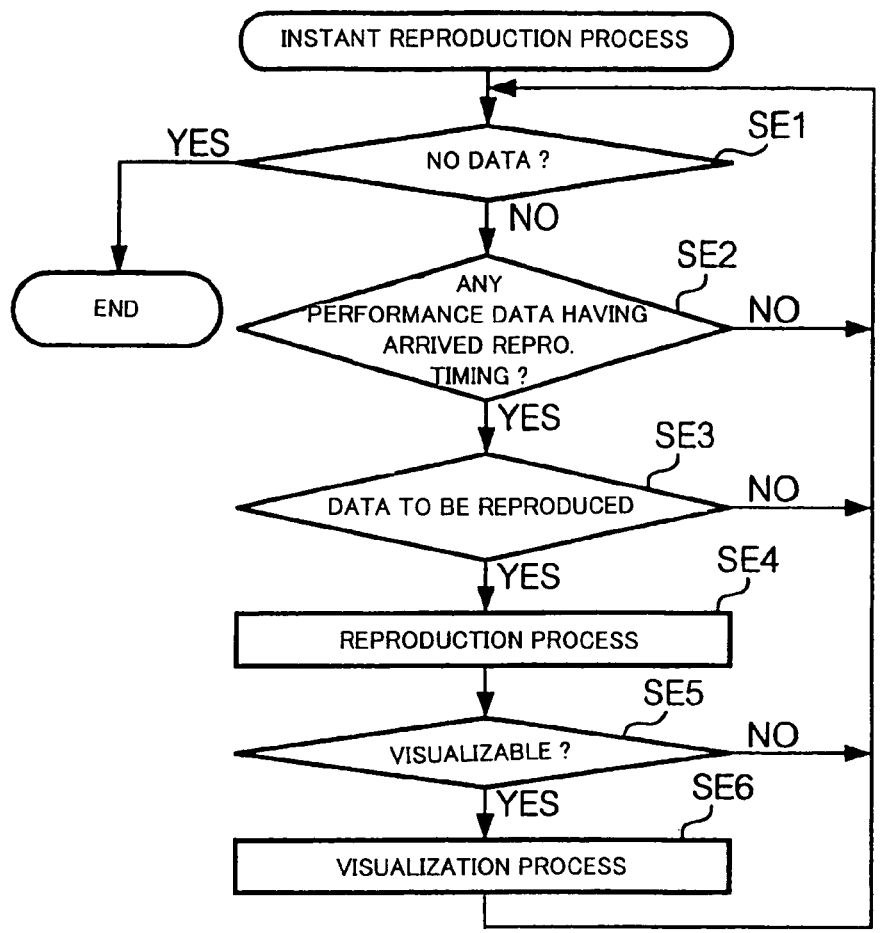
FIG. 15 is a flow chart showing a flow of operations performed by the terminal in the training system of the present invention.
Figure 16:
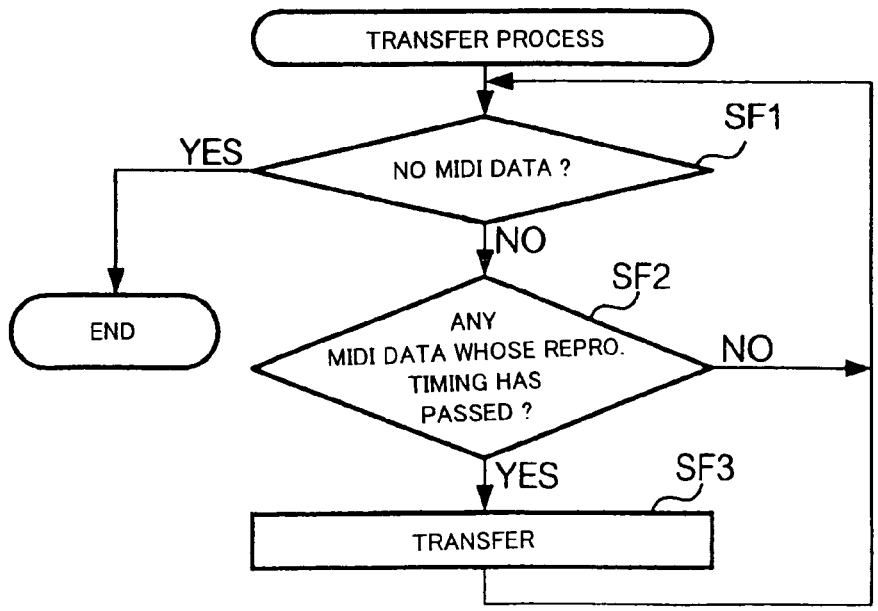
FIG. 16 is a flow chart showing a flow of operations performed by the terminal in the training system of the present invention.

Furthermore, a terminal program 236 is written in the hard disk 23. The terminal program 236 is a program for causing the CPU 21 to perform operations to be later described. If an instruction input to the instructor terminal 2A is one for initiating the execution of the terminal program 236, the CPU 21 reads out and executes the terminal program 236. At that time, the RAM 22 is used as a working area of the CPU 21. If the instruction input to the instructor terminal 2A is one for logging out of the classroom, the CPU 21 terminates the execution of the terminal program 236. Part of the operations performed by the CPU 11 on the basis of the terminal program 236 is shown in FIGS. 14-16 and will be later described in detail.

Each of the interfaces may be connected by either wired connection or wireless connection.

The student terminals 2B-2D are constructed similarly to the instructor terminal 2A.

Figure 17:
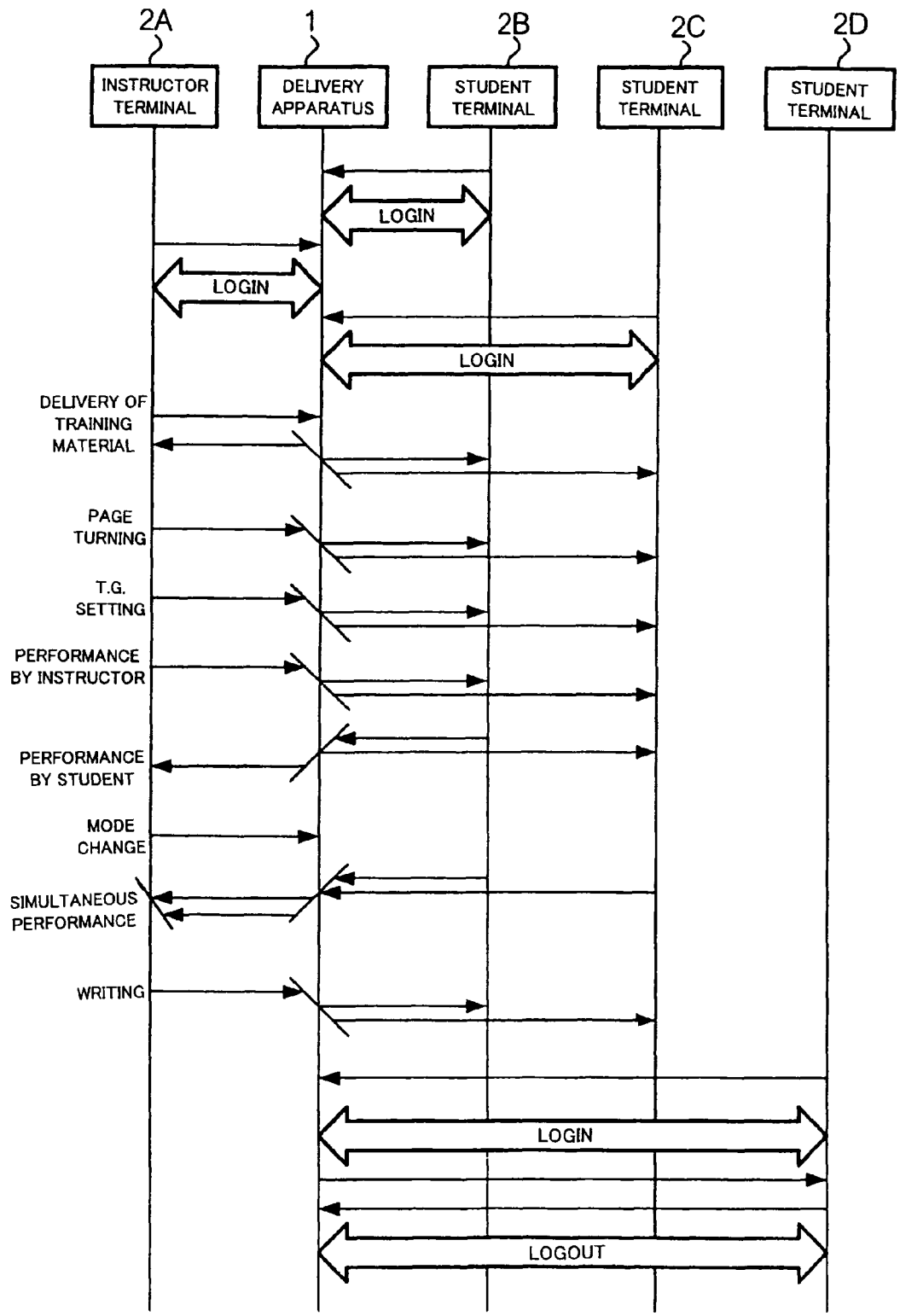
FIG. 17 is a sequence chart explanatory of an example of training carried out using the training system of the present invention.

2. Behavior:

The following paragraphs describe behavior of the instant embodiment of the training system in connection with an example of musical instrument performance training illustrated in FIG. 17.

2-1. Login of Member B:

First, member B starts login operation using the student terminal 2B. More specifically, as the login operation, member B manipulates the operation section 25 to transmit the predetermined URL and member ID "B" and enters, into the student terminal 2B, an instruction for logging into the classroom. The URL is a predetermined URL previously assigned to member B. Then, an operation signal is supplied from the operation section 25 to the CPU 21, in response to which the CPU 21 identifies the instruction entered by member B. Because the thus-identified instruction is an instruction for logging into the classroom by transmitting the predetermined URL and member ID "B", the CPU 21 communicates with the DNS server (not shown) via the communication section 24 and network 3 to acquire a communication address corresponding to the domain name in the URL (i.e., URL of the deliver device 1), and then writes the communication address into the RAM 22. Then, the CPU 21 generates a login command including the URL and member ID, creates a packet having the login command stored in the body region P31 thereof, and then transmits the thus-created packet to the delivery apparatus 1. Because the packet is addressed to the delivery apparatus 1, it contains the communication address of the delivery apparatus 1 in its destination address area P1. Further, because the packet is transmitted from the student terminal 2B, the communication address of the student terminal 2B is stored in the transmission source address area P2. This packet is sent to the delivery apparatus 1 via the communication section 24 and network 3.

The CPU 11 of the delivery apparatus 1 receives the packet (step SA1 of FIG. 8), and it determines whether or not the received packet contains a valid login command (step SA2). Because the login command is stored in the body region P31 of the received packet, the URL in the login command is a predetermined URL and the member ID "B" within the login command is stored in the member table T1, a "YES" determination is made at step SA2. Thus, the CPU 11 performs a login process (step SA3) flowcharted in FIG. 9.

In the login process of FIG. 9, the CPU 11 carries out a sharing process at step SB1 with member B handled as a sharing member. In the sharing process, the CPU 11 updates the member table T1, by which the state of member B is changed from "logout" to "login" and the communication address of the student terminal 2B is stored as the communication address of the terminal 2 used by member B. As a consequence, the contents of the member table T1 is changed or updated as illustrated in FIG. 18.

Further, in the sharing process, the CPU 11 creates first to third packets and transmits these created packets to the student terminal 2B. In the type region P33 of each of these packets, there is stored type data indicating that the type of the packet is "command".

In the body region P31 of the first packet, there is stored a login notification command that includes the member ID "B". In the body region P31 of the second packet, there is stored a screen delivery command that includes training screen data 132. In the body region P31 of the third packet, there is stored a sharing state notification command including the member table T1. The third packet should be transmitted to the terminals used by all of the sharing members; however, in this case, the third packet is transmitted only to the student terminal 2B because, in this case, member B is the only sharing member.

Then, at step SB2, the CPU 11 determines, with reference to the main table T1, whether or not the attribute of member B is "instructor". Because the attribute of member B is "student", a NO determination is made at step SB2, so that the CPU 11 further determines at step SB3 whether there is currently stored "follow-causing data". Because no data is currently written in the sharing area 131, a NO determination is made at step SB3, so that the CPU 11 terminates the login process.

The CPU 21 of the student terminal 2B receives the above-mentioned first packet, and writes the member ID "B" within the received packet into the self-ID area 232. The CPU 21 also receives the above-mentioned second packet, and writes the training screen data 132 within the received packet into the screen area 233. The CPU 21 also receives the above-mentioned third packet, and changes the contents of the member table T1 within the received packet to thereby create a correspondency table T2. Then, the CPU 21 writes the correspondency table T2 into the correspondency area 234. By the change, the state of member B changes from "login" to "itself". As a consequence, the correspondency table T2 illustrated in FIG. 19 is written into the correspondency area 234.

Further, the CPU 21 refers to the correspondency table T2 and secures the instant reproduction area 221 and MIDI area 237 for each of the members whose state is not "itself" (i.e., for each of members A, C and D). The instant reproduction areas 221 are secured in the RAM 22, and the MIDI areas 237 are secured in the hard disk 13. Furthermore, the CPU 21 refers to the correspondency table T2 to create a selection table T3 and writes the created selection table T3 into the selection area 235 of the hard disk 23. Here, the "login" and "logout" states are changed into the "selected" state, and the "itself" state is changed into "non-selected". As a consequence, the selection table T3 as illustrated in FIG. 20 is written into the selection area 235.

During that time, the camera 44B images member B and supplies the student terminal 2B with image data indicative of the image of member B. The CPU 21 receives the image data from the camera 44B, creates a packet that has the received image data (dynamic data) stored in the body region P31 thereof, and transmits the thus-created packet to the delivery apparatus 1. The type region P33 of the transmitted packet has type data indicating that the type of the packet is "image data".

The microphone 42B picks up a voice of member B and supplies the student terminal 2B with the picked-up voice as voice data. The CPU 21 receives the voice data from the microphone 42B, creates a packet that has the received voice data (dynamic data) stored in the body region P31 thereof, and transmits the thus-created packet to the delivery apparatus 1. The type region P33 of the transmitted packet has type data indicating that the type of the packet is "voice data".

In the generation source area P32 of each of these packets, there is stored the member ID "B".

The CPU 21 secures the transmission area 222 in the RAM 22 and starts a MIDI transmission process as flowcharted in FIG. 14. In the MIDI transmission process, the CPU 21 clears the stored contents of the transmission area 222 at step SC1. Then, the CPU 21 sets a transmitting timer that times out upon lapse of a predetermined acquisition time; however, because, at this stage, the MIDI musical instrument 41B has not yet been operated, the transmitting timer times out without any data being written into the transmission area 222 (i.e., NO determination at step SC2, NO determination at step SC3, NO determination at step SC2, . . . , and YES determination at step SC2). Thus, the CPU 21 repeats an operation for resetting the transmitting timer having timed out (i.e., NO determination at step SC4, SC1, . . . ).

The CPU 11 of the delivery apparatus 1 receives the packet from the student terminal 2B, and it then determines whether or not the received packet contains a valid login command (steps SA1 and SA2). The packet received at this stage is one having image data or voice data stored in the body region P31, and thus a NO determination is made at step SA2. Consequently, the CPU 11 refers to the member table T1 to determine whether the member represented by the member ID "B" in the generation source region P32 of the received packet (i.e., member B) is a sharing member (step SA4). Because member B is a sharing member, a YES determination is made at step SA4, so that the CPU 11 moves on to step SA5 to perform a packet process.

The type region P33 of the received packet has the type data indicating that the type of the packet is "image data" or "voice data". Thus, in the packet process, the CPU 11 extracts the data stored in the data area P3 of the packet, creates a packet having the extracted data stored in the data area P3 thereof, and then attempts to transmit the thus-created packet to the terminals 2 of all of the sharing members except for member B (i.e., NO determination at step SD1 of FIG. 10, NO determination at step SD2, NO determination at step SD3, and then step SD4). However, because, at this stage, member B is the only sharing member and thus there is no terminal 2 that is a destination of the packet, the CPU 11 does not transmit the created packet. Namely, the image data and image data from the student terminal 2B are discarded in the delivery apparatus 1.

Figure 21:
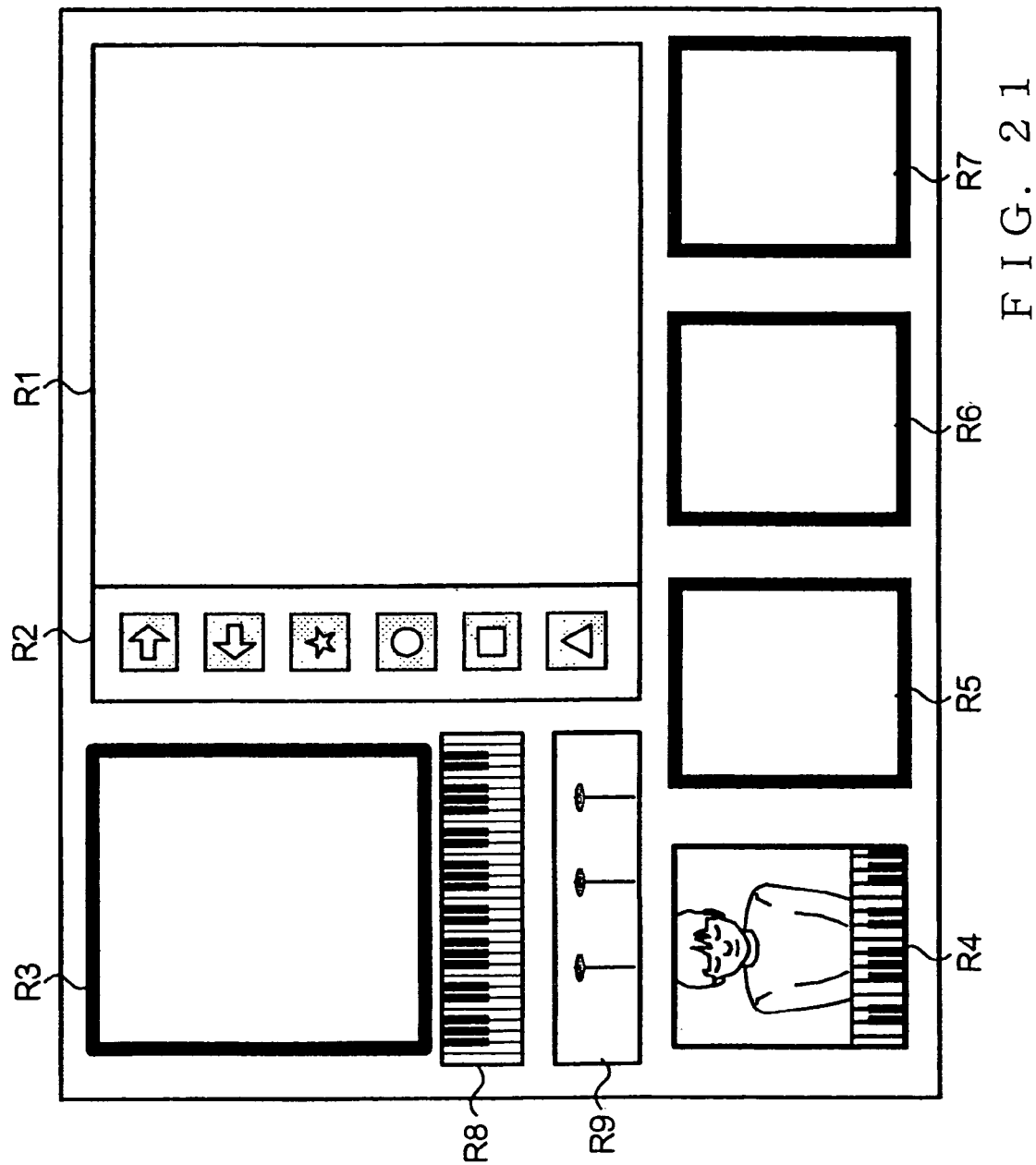
FIG. 21 is a diagram showing an example of a training screen displayed in the student terminal.

Further, because, at this stage, no data is transmitted from any other terminal to the student terminal 2B, the CPU 21 of the student terminal 2B creates image data representative of a training screen, using the image data from the camera 44B, training screen data 132 stored in the screen area 233, correspondency table T2 stored in the correspondency area 234 and selection table T3 stored in the selection area 235. Then, the CPU 21 writes the thus-created image data into the frame memory of the display 26. As a consequence, a training screen as illustrated in FIG. 21 is displayed on the display 26. On the training screen, the display areas R3 and R5-R7 selected by the selection table T3 are highlighted by thick-line frames, and the image represented by the image data from the camera 44B (i.e., image of member B) is displayed on the display area R4 with which the "itself" state is associated by the correspondency table T2.

2-2. Login of Member A:

Next, in the example of training of FIG. 17, member A performs login operation using the instructor terminal 2A. More specifically, as the login operation, member A manipulates the operation section 25 to transmit the predetermined URL and member ID "A" and enters, into the instructor terminal 2A, an instruction for logging into the classroom. As a consequence, the CPU 21 of the instructor terminal 2A generates a login command including the URL and member ID, creates a packet having the login command stored in the body region P31 thereof, and then transmits the thus-created packet to the delivery apparatus 1.

The CPU 11 of the delivery apparatus 1 receives the packet and performs the login process (YES determinations at steps SA1 and SA2, and then step SA3). Because the attribute of member A is "instructor" (i.e., YES determination at step SB2), presence of "follow-causing data" is not determined in this login process. As a result of the login process, member A becomes the sharing member and the member table T1 is updated in the delivery apparatus 1. In the updated member table T1, "login" has been registered as the state of member A, and the communication address of the instructor terminal 2A has been stored as the communication address of the terminal 2 used by member A.

Further, in the instructor terminal 2A, the member ID "A" is written in the self-ID area 232, the correspondency table T2 is written in the correspondency area 234 and the selection table T3 is stored in the selection area 235, as a result of the login process. Here, the "itself" state is associated with member A in the correspondency table T2, and the "non-selected" state is associated with the display area R3 in the selection table T3.

Because member A is made a sharing member through the login process, a packet similar to the above-mentioned third packet is sent to not only the instructor terminal 2A but also the student terminal 2B. The CPU 21 of the student terminal 2B receives that packet, creates a correspondency table T2 using the member table T1 stored in the received packet, and overwrites the correspondency table T2 into the correspondence area 234. Namely, the correspondency table T2 of the student terminal 2B is updated. Only one difference between the correspondency tables before and after the updating is that the state of member A has changed from "logout" to "login".

Furthermore, through the login process, training screen data 132 is written into the screen area 233 in the instructor terminal 2A.

In parallel with the above-mentioned operations, the CPU 21 of the instructor terminal 2A creates a packet having image data, received from the camera 44A, stored in the body region P31 thereof, and transmits the thus-created packet to the delivery apparatus 1. The CPU 21 also creates a packet having voice data, received from the microphone 42A, stored in the body region P31 thereof, and transmits the thus-created packet to the delivery apparatus 1. Further, the CPU 21 of the teacher terminal 2B creates a packet having image data, received from the camera 44B, stored in the body region P31 thereof and transmits the thus-created packet to the delivery apparatus 1. The CPU 21 also creates a packet having voice data, received from the microphone 42B, stored in the body region P31 thereof, and transmits the thus-created packet to the delivery apparatus 1.

The CPU 11 of the delivery apparatus 1 receives the packet from the instructor terminal 2A and performs the packet process (i.e., NO determinations at steps SA1 and SA2, YES determination at step SA4, and then step SA5). Because the packet is one including, in the type region P33, type data indicating that the type of the packet is "voice data" or "image data", the CPU 11 in the packet process extracts the data stored in the data area P3 of the received packet, creates a packet having the extracted data stored in the data area P3 thereof, and then transmits the thus-created packet to the terminals 2 of all of the sharing members except for member A (i.e., student terminal 2B) (i.e., NO determinations at steps SD1, SD2 and SD3, and then step SD4). Similar operations are performed on the packets received from the instructor terminal 2B. In the above-described manner, image data and voice data are transmitted from the instructor terminal 2A to the student terminal 2B, and image data and voice data from the student terminal 2B are transmitted to the instructor terminal 2A.

The CPU 21 of the instructor terminal 2A receives the packet addressed to the instructor terminal 2A. The packet received at this stage is one having image data or voice data stored in the body region P31 thereof. If type data indicating that the type of the packet is "voice data" is stored in the type region P33 of the received packet, the CPU 21 supplies the speaker 43A with the voice data stored in the body region P31. As a consequence, a voice of member B is audibly generated from the speaker 43A.

Figure 22:
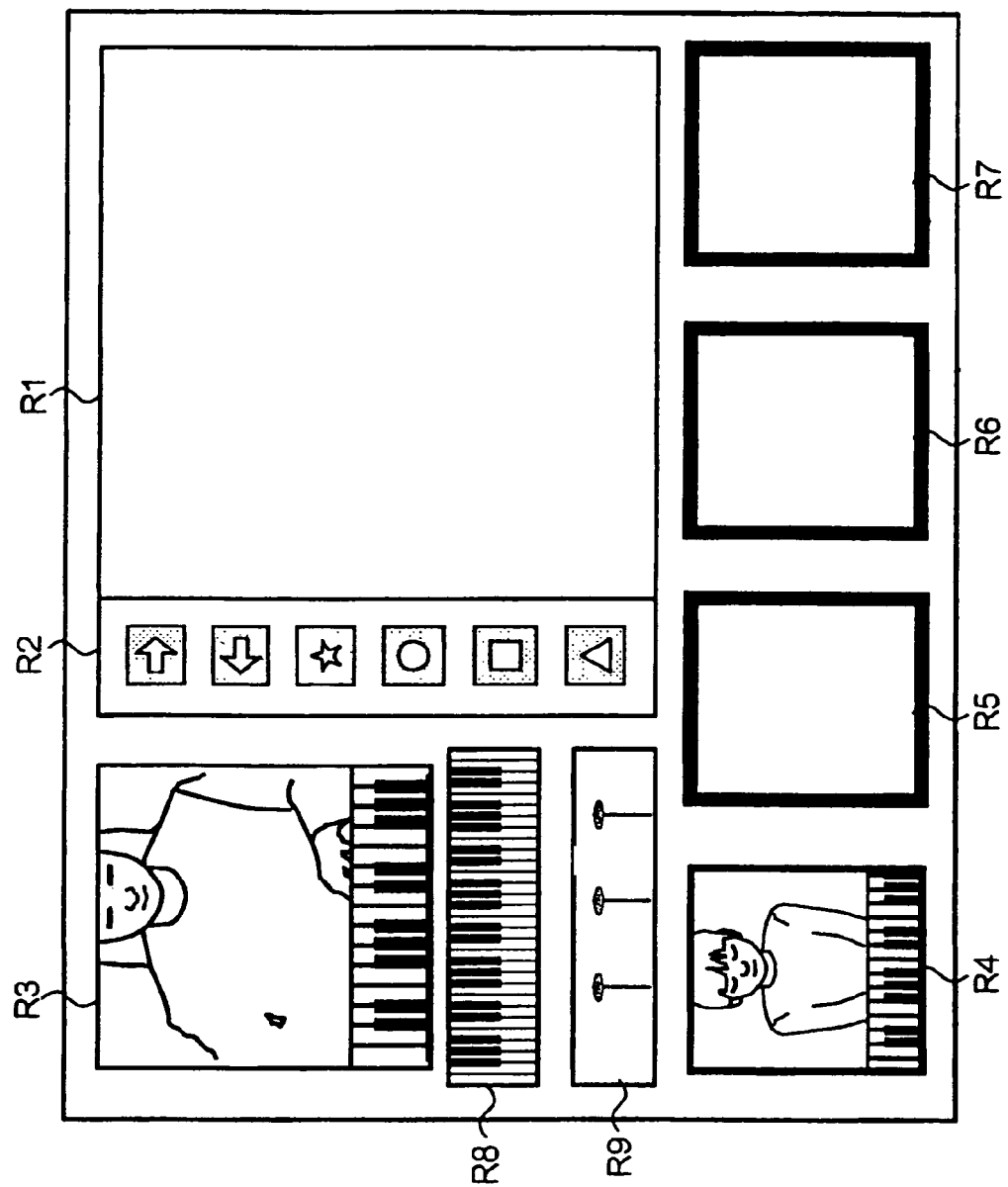
FIG. 22 is a diagram showing another example of a training screen displayed in the instructor terminal.

If, on the other hand, type data indicating that the type of the packet is "image data" is stored in the type region P33 of the received packet, the CPU 21 extracts the image data, stored in the body region P31, as image data of the member ID (member B in this case) stored in the generation source region P32 of the packet. Next, the CPU 21 of the instructor terminal 2A creates image data representative of a training screen, using the image data of member B, image data from the camera 44A, training screen data 132 stored in the screen area 233, correspondency table T2 stored in the correspondency area 234 and selection table T3 stored in the selection area 235. Then, the CPU 21 writes the thus-created image data into the frame memory of the display 26. As a consequence, a training screen as illustrated in FIG. 22 is displayed on the display 26.

On the training screen, the display areas R4-R7 selected by the selection table T3 are highlighted by thick-line frames, the image represented by the image data from the camera 44A (i.e., image of member A) is displayed on the display area R3 with which the "itself" state is associated by the correspondency table T2, and the image represented by the image data of member B (i.e., image of member B) is displayed on the display area R4 with which member B is associated by the correspondency table T2.

In generally the same manner, a voice of member A is audibly generated from the speaker 43B, and images of members A and B are displayed on the display 26 of the student terminal 2B.

2-3. Login of Member C:

Next, in the example of training of FIG. 17, member C performs login operation using the instructor terminal 2C, in response to which the delivery apparatus 1 performs a login process similar to the above-described login process performed in response to the login operation of member B. Through the login process, member C is made a sharing member and the member table T1 is updated in the delivery apparatus 1. In the updated member table T1, "login" has been registered as the state of member C, the communication address of the student terminal 2C has been stored as the communication address of the terminal 2 used by member C.

Further, in the instructor terminal 2C, the member ID "C" is written in the self-ID area 232, the correspondency table T2 is written in the correspondency area 234 and the selection table T3 is stored in the selection area 235, as a result of the login process. Here, the "itself" state is associated with member C in the correspondency table T2, and the "non-selected" state is associated with the display area R5 in the selection table T3.

Because member C has been made a sharing member through the login process, a packet similar to the above-mentioned third packet is sent to not only the instructor terminal 2A but also the student terminal 2B. Thus, in both of the instructor terminal 2A and student terminal 2B, the member table T1 is updated in the correspondency area 234. Only one difference between the correspondency tables T2 before and after the updating is that the state of member C has changed from "logout" to "login". Furthermore, through the login process, training screen data 132 is written into the screen area 233 in the instructor terminal 2C.

Figure 23:
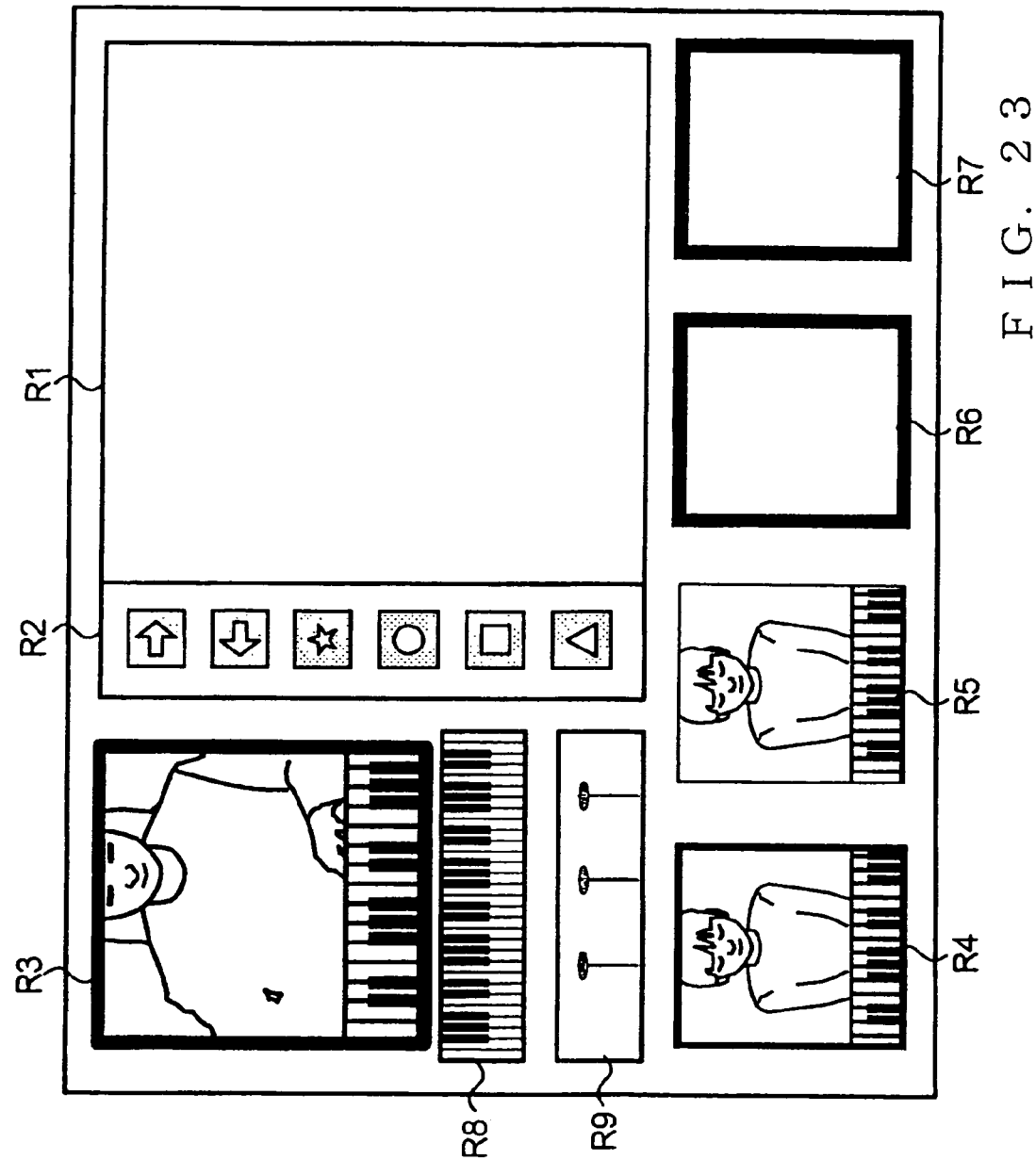
FIG. 23 is a diagram showing an example of a training screen displayed in another student terminal in the training system of the present invention.

Ultimately, voices of member A and member B are audibly generated from the speaker 43C, and a training screen as illustrated in FIG. 23 is displayed on the display 26 of the instructor terminal 2C. On the training screen of FIG. 23, the display areas R3, R4, R6 and R7 selected by the selection table T3 in the selection area 235 are highlighted by thick-line frames, the image represented by the image data from the camera 44C (i.e., image of member C) is displayed on the display area R5 with which the "itself" state is associated by the correspondency table T2 in the correspondency area 234, and the images represented by the image data of members A and B (i.e., images of members A and B) are displayed on the display areas R3 and R4 with which members A and B are associated by the correspondency table T2.

In generally the same manner, voices of members B and C are audibly generated from the speaker 43A, and images of members A-C are displayed on the display 26 of the instructor terminal 2A. Further, voices of members A and B are audibly generated from the speaker 43B, and images of members A-C are displayed on the display 26 of the student terminal 2B.

2-4. Delivery of Training Material:

In the example training of FIG. 17, member A operates the operation section 25 of the instructor terminal 2A to enter, into the terminal 2A, a request for delivery of training material data to be used for musical instrument performance training. The CPU 21 receives an operation signal generated from the operation section 25 in response to the operation by member A and identifies the request entered by member A. Because the identified request is for delivery of training material data to be used for training, the CPU 21 then generates a training material delivery command, creates a packet having the thus-generated training material delivery command stored in the body region P31 thereof, and transmits the created packet to the delivery apparatus 1. The packet also has, in the type region P33, type data indicating that the type of the packet is "command", as well as the member ID "A" in the generation source region P32. The member ID "A" is the one written in the self-ID are 232.

The CPU 11 of the delivery apparatus 1 receives the packet from the instructor terminal 2A and performs the packet process of FIG. 10 (i.e., NO determinations at steps SA1 and SA2, YES determination at step SA4, and then step SA5). Because the packet includes, in the type region P33, the type data indicating that the type of the packet is "command", the CPU 11 in the packet process determines whether or not the command is a valid logout command (i.e., YES determination at step SD1, and then step SD5). Because the command in question is a training material delivery command, a NO determination is made at step SD5, so that the CPU 11 further determines at step SD6, with reference to the member table T1, whether the member represented by the member ID in the generation source region P32 of the received packet is "instructor".

Because the member ID in the generation source region P32 of the received packet is "A" and the attribute "instructor" is associated with the member ID "A", a YES determination is made at step SD6. Thus, the CPU 11 determines at step SD7 whether the command in question is a training material delivery command, and, in this case, a YES determination is made at step SD7. Consequently, the CPU 11 reads out musical score data 133 (stationary data) and display page data 134 (stationary data) from the hard disk 13 and writes the thus read-out data into the sharing area 131. Also, the CPU 11 creates a packet having these training material data stored in the body region 31 thereof, and transmits the thus-created packet (steps SD8 and SD4). Specifically, the packet to be transmitted here is addressed to the instructor terminal 2A and student terminals 2B and 2C, and it has, in the type region P33, type data indicating that the type of the packet is "training material data".

Figure 24:
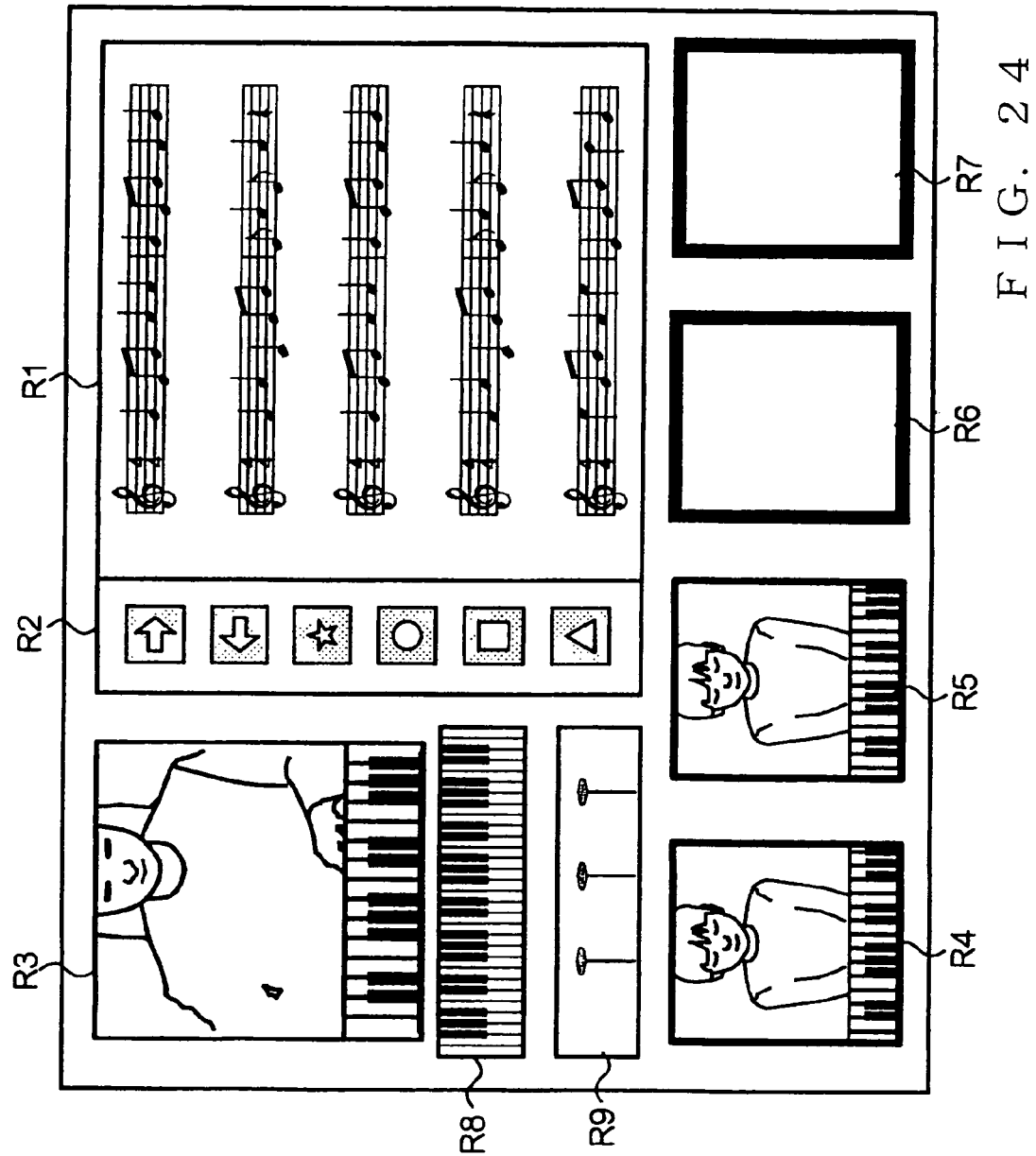
FIG. 24 is a diagram showing another example of the training screen displayed in the instructor terminal.

The CPU 21 of the instructor terminal 2A receives the packet addressed to the terminal 2A, and writes the training material data within the received packet into the training material area 231. Then, the CPU 21 creates image data representative of a training screen, using the training material data stored in the training material area 231, image data from the camera 44A, training screen data stored in the screen area 233, correspondency table T2 stored in the correspondency area 234 and selection table T3 stored in the selection area 235. Then, the CPU 21 writes the thus-created image data into the frame memory of the display 26. As a consequence, a training screen as illustrated in FIG. 24 is displayed on the display 26. On the display area R1 of the training screen, there are displayed the contents of the page represented by the display page data among the musical score data stored in the training material area 231.

Operations similar to the above-described are performed on the student terminals 2B and 2C, and, eventually, the same musical score is displayed on the instructor terminal 2A and student terminals 2B and 2C.

Note that, if a packet having a training material delivery command stored in the body region P3 is transmitted from the student terminal 2B, rather than from the instructor terminal 2A, to the delivery apparatus 1, the member ID "B" is stored in the generation source region P32 of the packet. Because the attribute "student" is associated with the member ID "B", the CPU 11 of the delivery apparatus 1 terminates the packet process without carrying out the above-described operations (i.e., NO determination at step SD6). Namely, of the sharing members, it is only the instructor A who can instruct delivery of the training material to be used for musical instrument performance training.

2-5. Page Turning of Training Material:

In the example training of FIG. 17, member A operates the operation section 25 of the instructor terminal 2A to enter, into the terminal 2A, an instruction for turning the pages of the training material. The CPU 21 receives an operation signal generated from the operation section 25 in response to the operation by member A and identifies the instruction entered by member A. Because the identified instruction is one for turning the pages of the training material, the CPU 21 updates the display page data in the training material area 231 so as to indicate the page number of a next page. Then, the CPU 21 creates image data representative of a training screen, using the training material data stored in the training material area 231, image data of members B and C, image data from the camera 44A, training screen data 132 stored in the screen area 233, correspondency table T2 stored in the correspondency area 234 and selection table T3 stored in the selection area 235. Then, the CPU 21 writes the thus-created image data into the frame memory of the display 26. As a consequence, the contents of the next page of the musical score are displayed on the training screen display area R1 of the instructor terminal 2A.

Once the display page data is updated, the CPU 21 creates a packet having the updated display page data (dynamic data) stored in the body region P31 thereof, and transmits the thus-created packet to the delivery apparatus 1. The packet has the member ID "A" stored in the generation source region P32 and also has, in the type region P33, type data indicating that the type of the packet is "training material data".

The CPU 11 of the delivery apparatus 1 receives the packet from the instructor terminal 2A and performs the packet process (i.e., NO determinations at steps SA1 and SA2, YES determination at step SA4, and then step SA5). Because the packet includes, in the type region P33, the type data indicating that the type of the packet is "training material data", the CPU 11 in the packet process determines, with reference to the member table T1, whether or not the attribute of the member represented by the member ID stored in the generation source region P32 of the packet is "instructor" (i.e., NO determination at step SD1, YES determination at step SD2, and then step SD9). Because the member ID in the generation source region P32 of the received packet is "A" and the attribute "instructor" is associated with the member ID "A", a YES determination is made at step SD9.

As a consequence, the CPU 11 writes the display page data, stored in the body region P31 of the packet, into the sharing area 131 at step SD10. Namely, the CPU 11 updates the display page data stored in the sharing area 131. Then, the CPU 11 extracts the data stored in the data area P3 of the packet, creates a packet having the extracted data stored in the data area P3 thereof, and then transmits the thus-created packet to the student terminals 2B and 2C currently used as the sharing members at step SD4.

The CPU 21 of the student terminal 2B receives the packet addressed to the terminal 2B, and writes the display page data, stored in the body region P31 of the packet, into the training material area 231 because type data indicating that the type of the packet is "training material data" is stored in the type region P33 of the received packet. Namely, the CPU 21 updates the training material data in the training material area 231. Eventually, the contents of the next page of the musical score are displayed on the training screen display area R1 of the student terminal 2B. Operations similar to the above-described are performed on the student terminal 2C. In this manner, the contents of the next page of the musical score are displayed in the instructor terminal 2A, student terminal 2B and student terminal 2C.

Note that, if a packet having such page turning data stored in the body region P3 is transmitted from the student terminal 2B, rather than from the instructor terminal 2A, to the delivery apparatus 1, the member ID "B" is stored in the generation source region P32 of the packet. Because the attribute "student" is associated with the member ID "B", the CPU 11 of the delivery apparatus 1 terminates the packet process without carrying out the above-described operations (i.e., NO determination at step SD9). Namely, of the sharing members, it is only the instructor A who can turn the pages of the musical score.

2-6. MIDI Tone Generator Setting by Member A:

In the example training of FIG. 17, member A operates the MIDI musical instrument 41A to set a tone color of the MIDI tone generator 412. At that time, MIDI data is supplied from the MIDI musical instrument 41A to the instructor terminal 2A, so that the CPU 21 receives the MIDI data. Upon receipt of the MIDI data, the CPU 21, which is carrying out a transmission process of FIG. 14, determines whether the received MIDI data is one that is unnecessary for the musical instrument performance training and should be filtered to avoid requirements going beyond the border of the training (e.g., dump request), one that should be filtered to reduce the quantity of data to be transmitted (e.g., MIDI data not used for later-described image generation, such as successive values representative of positions the pedal/keyboard), or one that should be filtered because it does not fit the level and/or contents of the training (i.e., YES determination at step SC3, and then step SC6). Because the received MIDI data is one for setting a tone color of the MIDI tone generator 412, a NO determination is made at step SC6, so that the CPU 21 moves on to step SC7. At step SC7, the CPU 21 generates performance data by associating the received or input MIDI data with time data indicative of the current time, and writes the thus-generated performance data into the transmission area 222 (step SC7). The CPU 21 repeats these operations until the transmitting timer times out.

Once the transmitting timer times out, the CPU 21 determines at step SC4 whether any performance data is currently written in the transmission area 222. Because, in this case, the above-mentioned performance data is currently written in the transmission area 222, a YES determination is made at step SC4. Consequently, the CPU 21 reads out the performance data from the transmission area 222, creates a packet having the read-out performance data (dynamic data) stored in the body region P31 thereof, and transmits the thus-created packet to the delivery apparatus 1 (i.e., YES determinations at steps SC2 and SC4, and then step SC5). This packet has the member ID "A" stored in the generation source region P32 and also has, in the type region P33, type data indicating that the type of the packet is "performance data".

The CPU 11 of the delivery apparatus 1 receives the packet from the instructor terminal 2A and performs the packet process of FIG. 10 (i.e., NO determinations at steps SA1 and SA2, YES determination at step SA4, and then step SA5). Because the received packet includes, in the type region P33, the type data indicating that the type of the packet is "performance data", the CPU 11 in the packet process determines whether the performance data in the body region P31 includes at least one of a dump request and a dump response (i.e., NO determinations at steps SD1 and SD2, YES determination at step SD3, and then step SD11). Because the performance data of the packet is MIDI data for setting a tone color of the MIDI tone generator 412, a NO determination is made at step SD11.

Thus, the CPU 11 in the packet process determines, with reference to the member table T1, whether or not the attribute of the member represented by the member ID stored in the generation source region P32 of the packet is "instructor" (step SD12). Because the member ID in the generation source region P32 of the received packet is "A" and the attribute "instructor" is associated with the member ID "A", a YES determination is made at step SD12. Consequently, the CPU 11 extracts the MIDI data for setting a tone color of the MIDI tone generator 412 from the performance data stored in the body region P31 of the packet, and writes the extracted MIDI data (dynamic data) into the sharing area 131 at step SD13.

The CPU 11 then extracts the performance data stored in the data area P3 of the packet, creates a packet having the extracted performance data stored in the data area P3 thereof, and then transmits the thus-created packet to the student terminals 2B and 2C, at step SD4.

The CPU 21 of the student terminal 2B receives the packet addressed to the terminal 2B. Because type data indicating that the type of the packet is "performance data" is stored in the type region P33 of the received packet, the CPU 21 determines whether any time data is stored in the body region P31 of the received packet. Because the time data is stored in the body region P31 of the packet, the CPU 21 extracts the performance data in the body region P31 as performance data of the member represented by the member ID stored in the generation source region P32 (member A in this case), and adds the extracted performance data to the instant reproduction area 221 provided for the member. Then, upon lapse of a preset margin time (e.g., 500 ms) from the time point at which the reception of the packet in question started, the CPU 21 causes the reproducing timer to start running or measuring the time with the value of the time data, initially written in the instant reproduction area 221 provided for member A, as an initial time value, and performs an instant reproduction process of FIG. 15 and a transfer process of FIG. 16 concurrently in a parallel fashion. Note that the above-mentioned margin time is preset in order to absorb variations in packet transfer delay occurring on the network 3.

In the instant reproduction process, the CPU 21 continues to determine whether performance data having reached predetermined reproduction timing is present in the instant reproduction area 221 (i.e., NO determinations at steps SE1 and SE2); the determination is made by comparing the current count of the reproducing timer and the time data stored in the instant reproduction area 221. Once the reproduction timing of the performance data, written in the instant reproduction area 221 for member A, arrives, the CPU 21 further determines, with reference to the correspondency table T2 and selection table T3, whether the performance data having reached the predetermined reproduction timing has been selected as performance data to be reproduced (i.e., YES determination at step SE2, and then step SE3). Because, in this case, the selection state of the display area R3 corresponding to member A is "selected", a YES determination is made at step SE3.

Thus, the CPU 21 performs a reproduction process on the performance data having reached the predetermined reproduction timing at step SE4. Namely, the CPU 21 extracts the MIDI data from the performance data having reached the predetermined reproduction timing and supplies the extracted MIDI data to the MIDI musical instrument 41B. Since the MIDI data supplied to the MIDI musical instrument 41B is one for setting a tone color of the MIDI tone generator 412, a tone color of the MIDI tone generator 412 of the MIDI musical instrument 41B is set in accordance with the supplied MIDI data.

Further, the CPU 21 determines at step SE5 whether the MIDI data supplied to the MIDI musical instrument 41B includes visualizable MIDI data. The "visualizable MIDI data" is MIDI data that can be converted into movement of an operator, such as the keyboard or pedal, that is used during a performance. Because, in this case, the MIDI data supplied to the MIDI musical instrument 41B is one for setting a tone color of the MIDI tone generator 412, a NO determination is made at step SE5, so that the CPU 21 does not perform a visualization process.

In the transfer process of FIG. 16, the CPU 21 repeats an operation for transferring the performance data, whose reproduction timing has passed, from the instant reproduction area 221 to the MIDI area 237 for member A (i.e., NO determination at step SF1, YES determination at step SF2, and then step SF3), until all the written performance data are transferred from the instant reproduction area 221 for member A (i.e., YES determinations at steps SF1 and SF2, and then step SF3). Once all the written performance data have been transferred from the instant reproduction area 221 for member A, the CPU 21 terminates the transfer process and instant reproduction process (i.e., YES determinations at steps SF1 and SE1).

Operations similar to the above-described are performed on the student terminal 2C. In this manner, tone colors are set for the MIDI tone generators of the MIDI musical instruments 41B and 41C in a similar manner to the tone color for the MIDI musical instrument 41A.

2-7. Performance by Member A:

In the example training of FIG. 17, member A operates the MIDI musical instrument 41A to perform music. In this case too, the CPU 21 creates a packet having performance data (dynamic data) stored in the body region P31 thereof, and transmits the thus-created packet to the delivery apparatus 1. However, MIDI data included in the performance data of the packet is not data for setting a tone color of the MIDI tone generator 412, but data corresponding to operation, by member A, of the keyboard or pedal.

The CPU 11 of the delivery apparatus 1 receives the packet from the instructor terminal 2A and performs the packet process (i.e., NO determinations at steps SA1 and SA2, YES determination at step SA4, and then step SA5). In this case, the received packet includes, in the type region P33, type data indicating that the type of the packet is "performance data", neither a dump request nor a dump response is included in the performance data stored in the body region P31, and the attribute of the member represented by the member ID stored in the generation source region P32 of the packet is "instructor". Therefore, in the packet process, the CPU 11 attempts to extract, from the performance data stored in the body region P31, MIDI data for setting a tone color of the MIDI tone generator 412 (i.e., NO determinations at steps SD1 and SD2, YES determination at step SD3, NO determination at step SD11, YES determination at step SD12, and then step SD13).

However, because the MIDI data stored in the body region P31 of the packet is data corresponding to operation of the keyboard or pedal, rather than data for setting a tone color of the MIDI tone generator 412, the CPU 11 fails in the above-mentioned MIDI data extraction. Thus, in this case, no MIDI data is written into the sharing area 131. Then, the CPU 11 extracts the data stored in the data area P3 of the packet, creates a packet having the extracted data stored in the data area P3 thereof, and then transmits the thus-created packet to the student terminals 2B and 2C, at step SD4.

The CPU 21 of the student terminal 2B receives the packet addressed to the terminal 2B and performs operations, similar to the above-described, on the packet. However, because the MIDI data included in the performance data stored in the body region P31 of the packet is data corresponding to operation of the keyboard or pedal, a tone is audibly generated by the MIDI musical instrument 41B in accordance with the MIDI data; that is, a tone corresponding to the performance operation by member A is output from the MIDI musical instrument 41B.

Further, because the MIDI data included in the performance data stored in the body region P31 of the received packet is data corresponding to operation of the keyboard or pedal, it can be converted into visible form, i.e. can be visualized, so that the CPU 21 performs the visualization process (i.e., YES determination at step SE5, and then step SE6).

In the visualization process, if given MIDI data in performance data having arrived at predetermined reproduction timing is data corresponding to the operation of the keyboard, the CPU 21 generates image data indicative of the operation of the keyboard using the MIDI data and a graphic image emulating the keyboard of the MIDI musical instrument 41. If, on the other hand, the given MIDI data in the performance data having arrived at the predetermined reproduction timing is data corresponding to the operation of the pedal, the CPU 21 generates image data indicative of the operation of the pedal using the MIDI data and graphic image emulating the pedal of the MIDI musical instrument 41.

Figure 25:
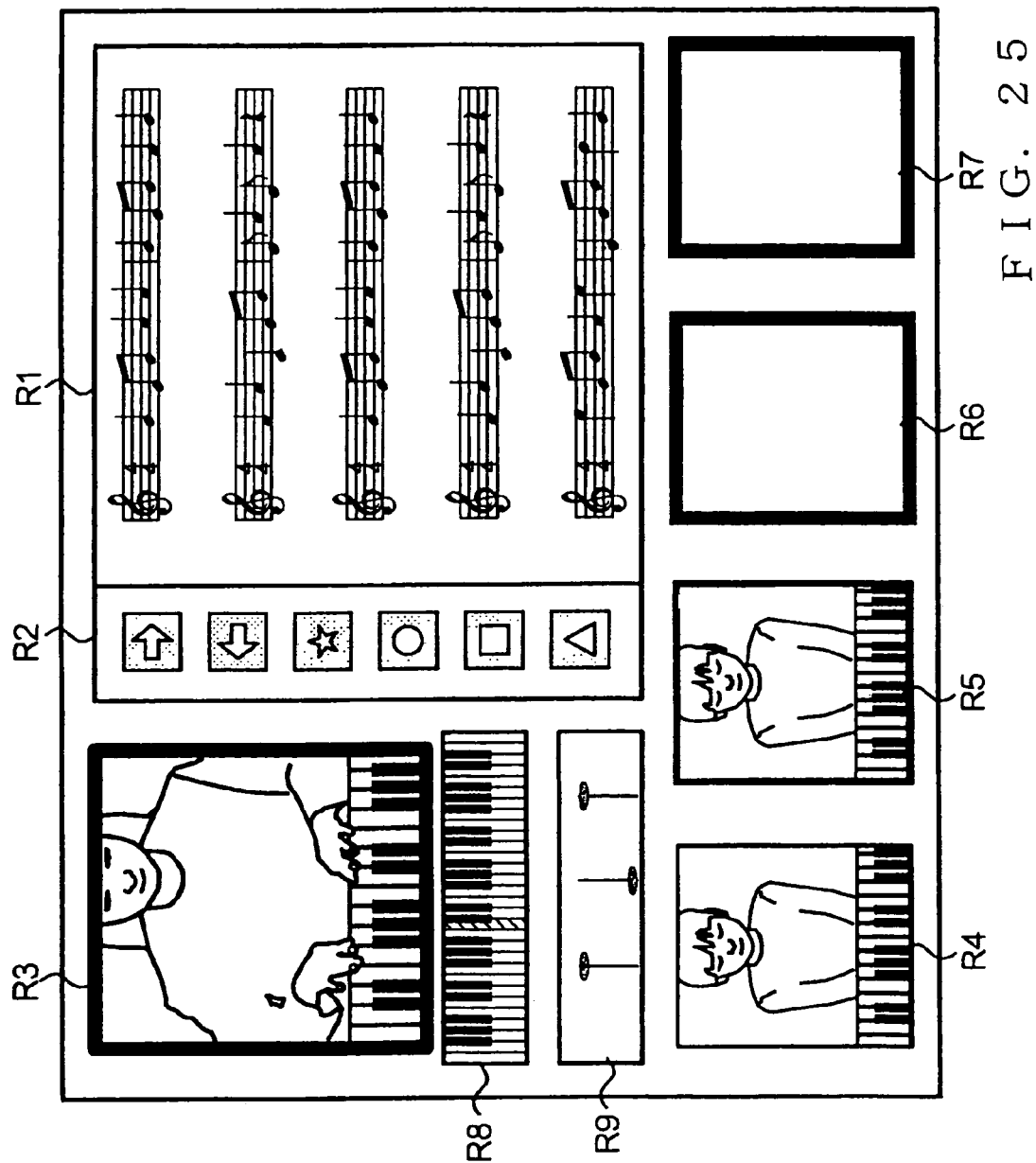
FIG. 25 is a diagram showing still another example of the training screen displayed in the student terminal.

Then, the CPU 21 creates image data representative of a training screen, using the generated image data, training material data stored in the training material area 231, image data of members B and C, image data from the camera 44A, training screen data 132 stored in the screen area 233, correspondency table T2 stored in the correspondency area 234 and selection table T3 stored in the selection area 235. After that, the CPU 21 writes the thus-created image data into the frame memory of the display 26. As a consequence, a training screen as illustrated in FIG. 25 is displayed on the display 26. On the display area R8 of the training screen, there is displayed the image representing the contents of the keyboard operation using the graphic image emulating the keyboard. On the display area R9 of the training screen, there is displayed the image representing the contents of the pedal operation using the graphic image emulating the pedal. Further, on the training screen, keys that are currently depressed and keys that are not currently depressed are displayed in different colors, and the pedal when it is being stepped on and the pedal when it is not being stepped on are displayed in different positions.

Operations similar to the above-described are performed on the student terminal 2C. In this manner, a tone corresponding to the performance by the instructor A is output from the MIDI musical instruments 41B and 41C, and the contents of the operation, by the instructor A, of the MIDI musical instrument 41A are displayed on the student terminals 2B and 2C, using the graphic image emulating the keyboard or pedal.

2-8. Performance by Member A:

In the example training of FIG. 17, member B operates the MIDI musical instrument 41B to perform music. In this case, the CPU 21 of the student terminal 2B creates a packet having performance data stored in the body region P31 thereof, and transmits the thus-created packet to the delivery apparatus 1. The performance data contained in this packet is data where MIDI data, corresponding to operation of the keyboard or pedal, and time data are associated with each other. Also, the member ID "B" is stored in the generation source region P32 of this packet.

The CPU 11 of the delivery apparatus 1 receives the packet from the student terminal 2B and performs the packet process (i.e., NO determinations at steps SA1 and SA2, YES determination at step SA4, and then step SA5). In this case, the received packet includes, in the type region P33, type data indicating that the type of the packet is "performance data", neither a dump request nor a dump response is included in the performance data stored in the body region P31, and the attribute of the member represented by the member ID stored in the generation source region P32 of the packet is "student". Therefore, in the packet process, the CPU 11 determines whether the performance data stored in the body region P31 includes MIDI data for setting a tone color of the MIDI tone generator 412 (i.e., NO determinations at steps SD1 and SD2, YES determination at step SD3, NO determinations at steps SD11 and SD12, and then step SD14).

Because, in this case, the MIDI data included in the performance data stored in the body region P31 is data corresponding to operation of the keyboard or pedal, a NO determination is made at step SD14. Thus, at step SD15, the CPU 11 determines, with reference to the mode flag 135, whether the current delivery mode is the sharing mode. Because the delivery mode at this stage is the sharing mode, the CPU 11 extracts the data stored in the data area P3 of the packet, creates a packet having the extracted data stored in the data area P3 thereof, and then transmits the thus-created packet to the instructor terminal 2A and student terminal 2C (i.e., YES determination at step SD15, and then step SD4).

The CPU 21 of the instructor terminal 2A receives the packet, and performs an instant reproduction process and transfer process similar to the above-described; similar operations are performed in the student terminal 2C as well. As a consequence, a tone corresponding to the performance by the student B is audibly generated from the MIDI musical instruments 41A and 41C, and the contents of the operation, by the student B, of the MIDI musical instrument 41B are displayed on the terminals 2A and 2C, using the graphic image emulating the keyboard or pedal.

Normally, once member B sets a tone color of the MIDI tone generator 412 by manipulating the MIDI musical instrument 41B, a packet having performance data stored in the body region P31 thereof is transmitted from the student terminal 2B to the delivery apparatus 1. However, because, in this case, the attribute of the member represented by the member ID stored in the generation source region P32 of the packet is "student" and the performance data stored in the body region P31 includes MIDI data for setting a tone color of the MIDI tone generator 412, the CPU 11 of the delivery apparatus 1 discards the packet after receipt of the packet (i.e., NO determination at step SD12 and YES determination at step SD14). Namely, of the sharing members, it is only the instructor A who can deliver MIDI data for setting a tone color of the MIDI tone generator 412.

2-9. Simultaneous Performance by Members B and C:

In the example training of FIG. 17, member A operates the operation section 25 of the instructor terminal 2A to enter, into the instructor terminal 2A, an instruction for changing the delivery mode. As a consequence, a packet having a mode change command stored in the body region P31 thereof is transmitted from the instructor terminal 2A to the delivery apparatus 1. This packet has the member ID "A" stored in the generation source region P32 and also has, in the type region P33, type data indicating that the type of the packet is "command".

The CPU 11 of the delivery apparatus 1 receives the packet from the instructor terminal 2A and performs the packet process (i.e., NO determinations at steps SA1 and SA2, YES determination at step SA4, and then step SA5). In this case, the received packet includes, in the type region P33, type data indicating that the type of the packet is "command", the command stored in the body region P31 of the packet is not a valid logout command, the member ID "A" of the instructor A is stored in the generation source region P32 of the packet, and the command stored in the body region P31 is not a training material delivery command either. Thus, in the packet process, the CPU 11 determines whether the command stored in the body region P31 of the packet is a mode change command (i.e., YES determination at step SD1, NO determination at step SD5, YES determination at step SD6, NO determination at step SD7, and then step SD16).

Because the command stored in the body region P31 of the packet is a mode change command, a YES determination is made at step SD16. Thus, the CPU 11 changes the deliver mode of performance data at step SD17 by updating the mode flag in the hard disk 13; namely, the mode flag 135 is updated from the setting indicative of the sharing mode to the setting indicative of the individual mode.

Figure 26:
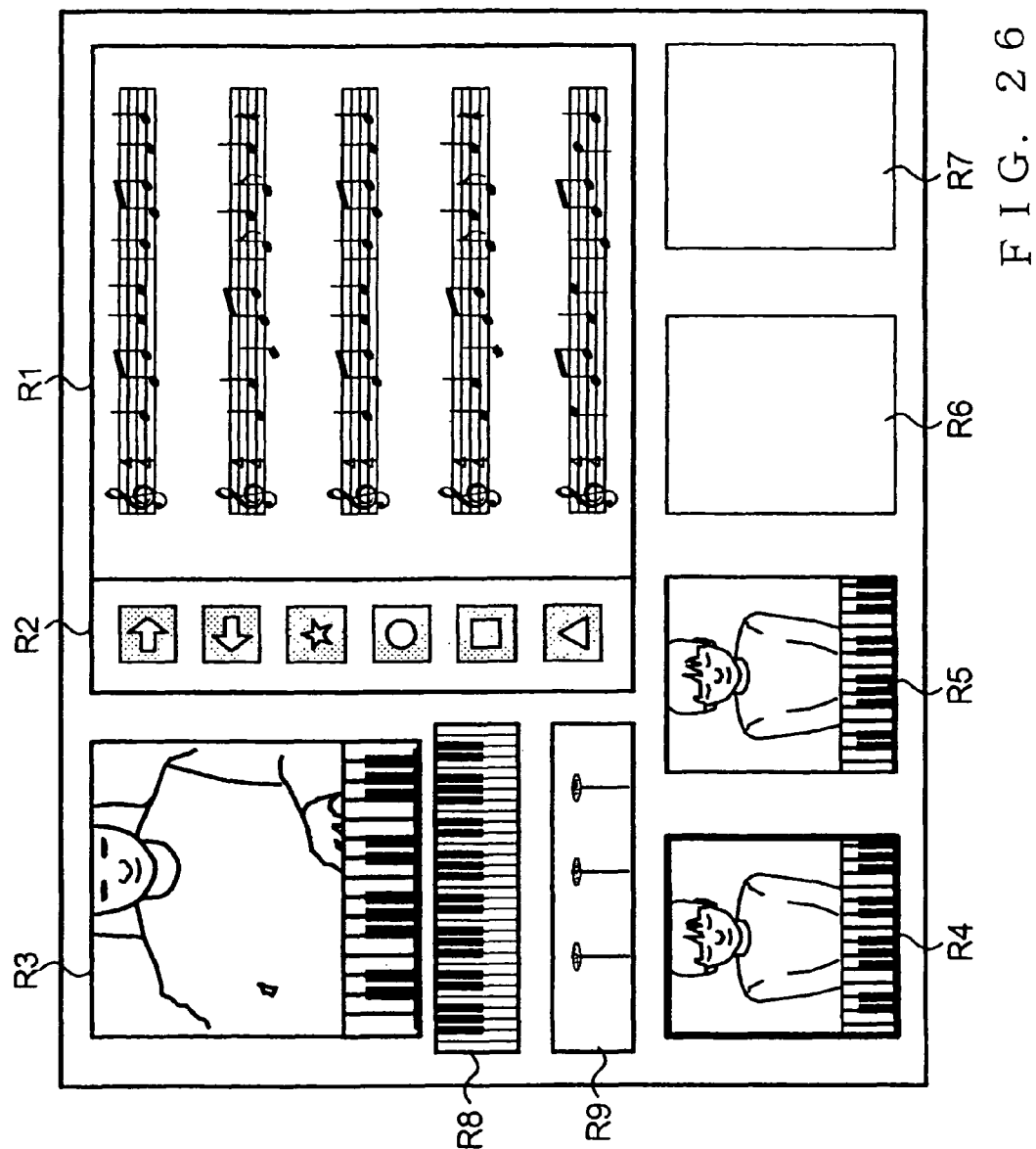
FIG. 26 is a diagram showing still another example of the training screen displayed in the instructor terminal.

Next, member A operates the operation section 25 of the instructor terminal 2A to enter, into the instructor terminal 2A, an instruction for selecting only the display area R4. In response to the operation by member A, the CPU 21 of the instructor terminal 2A updates the selection table T3 stored in the selection area 235 so that only the display area R4 is selected. As a consequence, a training screen as illustrated in FIG. 26 is displayed on the display 26 of the instructor terminal 2A, where only the display area R4 is highlighted by a thick-line frame.

Next, members B and C perform simultaneously, so that packets are transmitted from the student terminals 2B and 2C and received by the delivery apparatus 1. Performance data, where MIDI data corresponding to operation of the keyboard or pedal and time data are associated with each other, is stored in the body region P31 of the packet, and type data indicating that the type of the packet is "performance data" is stored in the type region P33 of the packet. Further, the member ID "B" is stored in the generation source region P32 of the packet transmitted from the student terminal 2B, and the member ID "C" is stored in the generation source region P32 of the packet transmitted from the student terminal 2C.

The CPU 11 of the delivery apparatus 1 receives the packets from the student terminals 2B and 2C and performs the packet process (i.e., NO determinations at steps SA1 and SA2, YES determination at step SA4, and then step SA5). In this case, each of the received packets includes, in the type region P33, type data indicating that the type of the packet is "performance data". In each of the received packets, neither a dump request nor a dump response is included in the performance data stored in the body region P31, and the member ID of member B or C is stored in the generation source region P32, and the performance data stored in the body region P31 does not include MIDI data for setting a tone color of the MIDI tone generator 412. Further, at this stage, the delivery mode indicated by the mode flag 135 is the individual mode. Thus, in the packet process, the CPU 11 extracts the data stored in the data area P3 of each of the received packets, creates a packet having the extracted data stored in the data area P3 thereof, and then transmits the thus-created packet to the instructor terminal 2A (i.e., NO determination at step SD15, and then step SD18). In this case, the created packets are not transmitted to the student terminals 2B and 2C.

The CPU 21 of the instructor terminal 2A receives the packets from the delivery apparatus 1. In each of the received packets, type data indicating that the type of the packet is "performance data" is stored in the type region P33, and performance data with time data is stored in the body region P31. Further, the member ID "B" or "C" is stored in the generation source region P32 of each of the packets. Thus, the CPU 21 writes the performance data, stored in the body region P31 of each of the received packets, into the corresponding instant reproduction area 221, and also performs an instant reproduction process and transfer process similar to the above-described. Note that the reproducing timer is started to run once the performance data has been written into any one of the instant reproduction areas 221 for members B and C.

At this stage, the display area R5 associated with member C has not been selected although the display area R4 associated with member B has been selected. Therefore, in the instant reproduction process, the CPU 21 performs the reproduction process and visualization process on the performance data currently written in the instant reproduction area 221 for member B, i.e. performance data of member B (i.e., NO determination at step SE1, YES determinations at steps SE2, SE3, SE4 and SE5, and then step SE6), but the CPU 21 does not perform such a reproduction process and visualization process on the performance data currently written in the instant reproduction area 221 for member C, i.e. performance data of member C (i.e., NO determination at step SE1, YES determination at step SE2, and then NO determination at step SE3).

As a consequence, a tone audibly generated from the MIDI musical instrument 41A corresponds to the performance by the student B, and the contents of the operation, by the student B, of the MIDI musical instrument 41B are displayed on the instructor 2A using the graphic image emulating the keyboard or pedal.

Once, upon completion of the instant reproduction process and transfer process, member A operates the operation section 25 of the instructor terminal 2A to enter, into the instructor terminal 2A, an instruction for selecting only the display area R5 and an instruction for reproducing MIDI data written in the MIDI area 237 for member C, the contents of the operation, by member C, of the MIDI musical instrument 41C are displayed on the training screen of the instructor terminal 2A using the graphic image emulating the keyboard or pedal, and a tone corresponding to the performance by member C is audibly generated from the MIDI musical instrument 41A.

Figure 27:
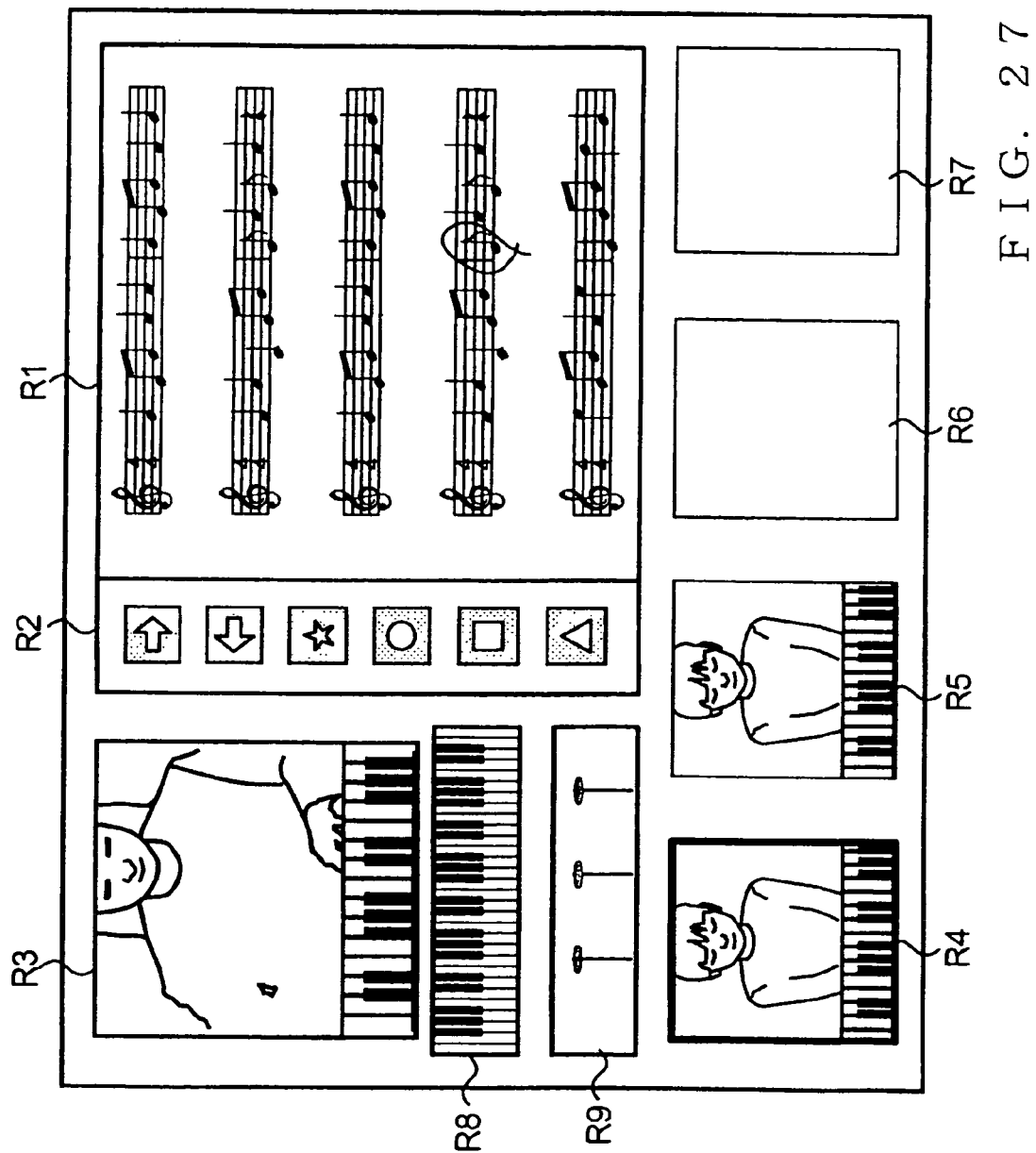
FIG. 27 is a diagram showing still another example of the training screen displayed in the instructor terminal.

2-10. Writing:

In the example training of FIG. 17, member A operates the operation section 25 of the instructor terminal 2A to enter, into the instructor terminal 2A, an instruction for writing a graphic image onto a musical score. In response to the operation by member A, the CPU 21 of the instructor terminal 2A generates and writes corresponding "writing data" into the training material area 231, so that a training screen as illustrated in FIG. 27 is displayed on the display 26 of the instructor terminal 2A. The contents of the musical score are displayed on the display area R1 of the training screen, which also indicate that a graphic image has been written on the musical score. The CPU 21 also creates a packet having the generated writing data (dynamic data) stored in the body region P31 thereof, and transmits the thus-created packet to the delivery apparatus 1. In the received packet, the member ID "A" is stored in the generation source area P32, and type data indicating that the type of the packet is "training material data" is stored in the type region P33.

The CPU 11 of the delivery apparatus 1 receives the packet from the instructor terminal 2A and performs the packet process (i.e., NO determinations at steps SA1 and SA2, YES determination at step SA4, and then step SA5). In the received packet, the type data indicating that the type of the packet is "training material data" is stored in the type region P33, and the member ID "A" of the instructor is stored in the generation source area P32, as noted above. Thus, in the packet process, the CPU 11 writes the writing data, stored in the body region P31 of the packet, into the sharing area 131 (i.e., NO determination at step SD1, YES determinations at steps SD2 and SD9, and then step SD10). Next, the CPU 11 extracts the data stored in the data area P3 of the received packet, creates a packet having the extracted data stored in the data area P3 thereof, and then transmits the thus-created packet to the student terminals 2B and 2C (step SD4).

The CPU 21 of the student terminal 2B receives the packet from the delivery apparatus 1. In the received packet, type data indicating that the type of the packet is "training material data" is stored in the type region P33, and the writing data is stored in the body region P31. The CPU 21 adds the writing data to the training material area 231. As a consequence, the graphic image written in response to the instruction by the instructor 2A is displayed, on the display area R1 of the training screen of the student terminal 2B, along with the musical score. Operations similar to the above-described are performed in the student terminal 2C.

In case the packet having the writing data stored in the body region P31 thereof has been transmitted from the student terminal 2B to the deliver device 1 by mistake, e.g. by erroneous operation by the student B, the CPU 11 of the delivery apparatus 1 terminates the packet process without carrying out the above-described operations (i.e., NO determination at step SD9), since the member ID "B" of the student B is stored in the generation source area P32. Namely, of the sharing members, it is only the instructor A who can write onto the musical score.

2-11. Login of Member D:

In the example training of FIG. 17, member D uses the student terminal 2D to perform login operation. The login operation and various processes to be performed in response to the login operation are similar to the above-described except that "follow-causing data" is delivered, and thus the following paragraphs describe only behavior pertaining to the "follow-causing data" delivery.

Once a packet having a valid login command stored in the body region P31 thereof is received from the student terminal 2D, the CPU 11 of the delivery apparatus 1 performs a login process (i.e., YES determinations at steps SA1 and SA2, and then step SA3). In this case, the member ID "D" is included in a login command stored in the body region P31 of the packet, and "follow-causing data" is written in the sharing area 131. Therefore, the CPU 11 performs a follow-causing data transmission process after performing a sharing process with member D as a sharing member (i.e., NO determinations at steps SB1 and SB2, YES determination at step SB3, and then step SB4).

In the follow-causing data transmission process, the CPU 11 extracts, from the sharing area 131, musical score data 133 (stationary data), display page data (dynamic data) and writing data (dynamic data), creates a packet having the extracted data stored in the body region P31 thereof, and transmits the thus-created packet to the student terminal 2D. Type data indicating that the type of the packet is "training material data" is stored in the type region P33 of the packet. Also, the CPU 11 extracts MIDI data (dynamic data) from the sharing area 131, creates a packet having the extracted data stored in the body region P31 thereof, and transmits the thus-created packet to the student terminal 2D. Type data indicating that the type of the packet is "performance data" is stored in the type region P33 of the packet.

The CPU 21 of the student terminal 2D receives the packets. For the packet where the type data indicating that the type of the packet is "training material data" is stored in the type region P33, the CPU 21 writes the follow-causing data, stored in the body region P31 of the packet, into the training material area 231. As a consequence, the same screen as currently displayed on the displayed on the display area R1 of the training screen of the other terminals 2 is displayed on the display area R1 of the training screen of the student terminal 2D.

For the packet where the type data indicating that the type of the packet is "performance data" is stored in the type region P33, the CPU 21 supplies the MIDI data to the MIDI musical instrument 41D because no data is stored in the body region P31 of the packet. As a consequence, the MIDI tone generator 412 of the MIDI musical instrument 41D is set to the same tone color as in the other MIDI musical instruments 41A, 41B and 41C.

2-12. Logout of Member D:

In the example training of FIG. 17, member D uses the student terminal 2D to perform logout operation. First, in the logout operation, member D uses the operation section 25 to transmit the pre-assigned predetermined URL and member ID "D" and enter, into the student terminal 2D, an instruction for logging out of the classroom. As a consequence, a packet having a logout command with the predetermined URL stored in the body region P31 is transmitted from the student terminal 2D to the delivery apparatus 1. The member ID "D" is stored in the generation source region P32 of the packet. Upon completion of the operation, the CPU 11 terminates execution of the terminal program 236.

The CPU 11 of the delivery apparatus 1 receives the packet and performs the packet process (i.e., NO determinations at steps SA1 and SA2, YES determination at step SA4, and then step SA5). In this case, the received packet includes, in the type region P33, type data indicating that the type of the packet is "command", the logout command with the predetermined URL is stored in the body region P31, and the member ID "D" of member D as a sharing member is stored in the generation source region P32 of the packet. Therefore, in the packet process, the CPU 11 carries out a logout process (i.e., YES determinations at steps SD1 and SD5, and then step SD19).

In the logout process, the CPU 11 changes the member of the member ID, stored in the generation source region P32 of the packet, into a "non-sharing member" status, and updates the member table T1 accordingly. Through such updating of the member table T1, the state of member D is changed from "login" to "logout", and the communication address of the terminal 2 used by member D is deleted from the member table T1. Further, in the logout process, the CPU 11 transmits a packet, similar to the above-mentioned third packet, to the instructor terminal 2A and student terminals 2B and 2C. This packet has, in the body region P31, a sharing state notification command including the latest member table T1.

Behavior following the above should be apparent from the foregoing description, and thus explanation thereof is omitted.

As having been described thus far, the CPU 11 of the delivery apparatus 1, upon receipt of a member ID registered in the member table T1, registers the communication address of the terminal, having transmitted the data, in the member table T1 in association with the member ID. Also, upon receipt of a training material delivery command, the CPU 11 determines whether or not the attribute registered in the member table T1 in association with the communication address of the terminal having transmitted the data is "instructor". If the attribute has been determined to be "instructor", the CPU 11 transmits the training material to all of the terminals having their respective communication addresses registered in the member table T1. Namely, member A allows all of the members currently logged in the classroom to share the training material, by just entering, into the instructor terminal 2A, an instruction for downloading the training material. Further, because the CPU 11 automatically performs the processing for allowing environments of a given member, having newly logged into the classroom, to follow environments of another member having logged into the classroom earlier than the given member, it is possible to significantly reduce the burden on the members.

3. Additional Explanation:

The above-described embodiment of the remote training system may be modified variously as set forth below.

For example, in the image representing the contents of operation of the keyboard, displayed on the display area R8 of the training screen, each key being currently depressed may be varied in accordance with a key depressing intensity.

The remote training system of the present invention may be applied to training of any other musical instruments than keyboard musical instruments, such as percussion instruments like drums.

Further, the visualization of MIDI data may be performed in a transmitting-end terminal. Namely, the transmitting-end terminal may create and transmit an image representing the contents of operation of the keyboard or pedal, using a graphic image emulating the keyboard, so that a receiving-end terminal can receive the image and display the received image.

Further, the remote training system of the present invention may be arranged to not perform the processing for allowing environments of a given member, having newly logged into the classroom, to follow environments of another member having logged into the classroom earlier than the given member.

Furthermore, the delivery apparatus may be arranged to write, into the sharing area, not only data transmitted from the instructor terminal but also data transmitted from any one of the student terminals.

Furthermore, the data to be shared may be in other form than the above-described, such as text data indicative of an instruction from the instructor to any of the students.

Furthermore, the instructor terminal may be arranged to perform the functions of the delivery apparatus.

Moreover, a plurality of communication connections may be established between the delivery apparatus and the terminals so that any desired one of the communication connections can be selectively used in accordance with the type of data to be transmitted. Where the communication connections are based on the TCP/IP (Transmission Control Protocol/Internet Protocol), port numbers of the TCP are used in place of the above-described type data.

As also described above, the CPU 21 of the terminal 2 receives, via the communication section 24, MIDI data corresponding to the contents of operation of the keyboard or pedal of the MIDI musical instrument 41, creates an image representing the contents of the operation using a graphic image emulating the keyboard or pedal in accordance with the received MIDI data, and displays the thus-created image on the display 26. The user of the terminal can visually check the operation of the musical instrument by viewing the displayed image. Further, the present invention can avoid wasteful transmission by filtering data, such as MIDI data representative of successive values of positions the keyboard or pedal or dump request, that is unnecessary for the training and not used for creation of the image. By the filtering, it is possible to avoid wasteful transmission.

Whereas, in the above-described first embodiment of the present invention, the terminal at the MIDI-data receiving end creates the image of the keyboard or pedal, the image of the keyboard or pedal may be created in any one of the other devices described above, as will be detailed hereinbelow.

Second Embodiment

In the second embodiment of the present invention, the image of the keyboard or image of the pedal is created in the delivery apparatus 1 that relays MIDI data. Namely, in the second embodiment, the management program and terminal program described above in relation to the first embodiment are modified such that the delivery apparatus 1 receives MIDI data to create an image representing the contents of the operation of the keyboard or pedal using a graphic image emulating the keyboard and transmits the thus-created image data to any of the terminals so that the terminal can display the image represented by the image data.

In the second embodiment, the receiving-end terminal need not have the function of visualizing MIDI data. Although transmission of image data normally requires a wider communication frequency band than transmission of MIDI data, the second embodiment may be modified such that, if the receiving-end terminal has the function of visualizing MIDI data, the delivery apparatus 1 transmits MIDI data to the terminal as is, but, if the receiving-end terminal does not have the function of visualizing MIDI data, the delivery apparatus 1 directly transmits, to the terminal, image data representative of an image representing the contents of the operation using a graphic image emulating the keyboard. With such modification, the embodiment can appropriately deal with a terminal having no MIDI data visualizing function without greatly increasing data traffic.

Third Embodiment

In the third embodiment, a terminal at a MIDI-data transmitting end creates an image representing the contents of operation of the keyboard or pedal using a graphic image emulating the keyboard. Namely, in this embodiment, the management program and terminal program described above in relation to the first embodiment is altered such that the transmitting-end terminal uses MIDI data, input from the MIDI musical instrument 41, to create an image representing the contents of operation of the keyboard or pedal using a graphic image emulating the keyboard and transmit the thus-created image data to the delivery apparatus 1. In this case, the delivery apparatus 1 receives and then transfers the image data to another terminal, so that the other terminal receives the image data to display an image represented by the image data. In the third embodiment, the receiving-end terminal need not have the function of visualizing MIDI data.

[Further Additional Explanation]

The above-described embodiments of the remote training system may be modified variously as set forth below.

Any of the terminals may use MIDI data, input from the MIDI musical instrument connected thereto, to display an image representing the contents of operation of the keyboard or pedal using a graphic image emulating the keyboard.

Further, a terminal at the MIDI-data receiving end may receive MIDI data, transmitted from a transmitting-end terminal, without intervention of the delivery apparatus 1 and may use the received MIDI data to display an image representing the contents of operation of the keyboard or pedal using a graphic image emulating the keyboard.

Furthermore, the first embodiment may be modified such that MIDI data representative of successive values of positions the keyboard or pedal is subjected to filtering in the delivery apparatus.

As a technical idea extracted from the foregoing explanation, there may be provided a program for causing a computer to function as: an input means for inputting performance data output from a musical instrument and representative of a performance on the musical instrument; a creation means for creating an image indicative of the performance, represented by the performance data received via the input means, using the performance data and graphic image emulating the musical instrument; and a display means for displaying the image created by the creation means.

What is claimed is:

1. A data delivery apparatus for use in a music training system, said music training system comprising an instructor terminal apparatus and a plurality of student terminal apparatus connected to said data delivery apparatus via a communication network, said data delivery apparatus comprising:
    a member storage section that, for each of members of a group, stores an identifier for identifying the member and attribute data indicative of an attribute of the member;
    a reception section that receives, via the network, data or command transmitted from said terminal apparatus;
    a write control section that, when an identifier transmitted from any one of said terminal apparatus has been received by said reception section, writes a communication address of the terminal apparatus, having transmitted the identifier, into said member storage section in association with the stored identifier identical with the received identifier;
    a data-writable sharing storage section that stores data to be shared among all of terminal apparatus of the group;
    a broadcast transmission control section that, when a command requesting delivery of training material data has been received by said reception section, determines whether the attribute data corresponding to the identifier stored in said member storage section in association with a communication address of a terminal apparatus having transmitted the command is indicative of an attribute of an instructor, and that, if it has been determined that the attribute data is indicative of the attribute, writes requested training material data, including at least musical store data, into said sharing storage section, and transmits, via the network, the requested training material data to all of terminal apparatus of the group having respective communication addresses thereof stored in said member storage section, wherein the training material data to be written into said sharing storage section includes not only training stationary data prestored in the data delivery apparatus but also dynamic data generated in response to an action of the instructor or a student; and
    a follow-causing transmission section that, when an identifier being transmitted from any one of the student terminal apparatus that has just now logged into said music training system has been received by said reception section and a communication address corresponding to the received identifier has been written into said member storage section by said write control section, determines whether any data is currently stored in said sharing storage section, and, if it has been determined that training material data is currently stored in said sharing storage section, transmits the training material data stored in said sharing storage section to the student terminal apparatus having the communication address corresponding to the received identifier, so that same training material data as training material data, including the stationary data and the dynamic data, stored in any other of the student terminals having already logged in said music training system is stored into the student terminal apparatus having just now logged into said music training system.

2. A data delivery apparatus as claimed in claim 1 which further comprises:
    a broadcast transfer control section that, when data to be transmitted from a terminal apparatus to another terminal apparatus has been received by said reception section, transmits, via the network, the received data to all of terminal apparatus of the group having respective communication addresses thereof stored in said member storage section.

3. A data delivery apparatus as claimed in claim 2 which further comprises:
    a dynamic write control section that, when data to be transmitted from a terminal apparatus to another terminal apparatus has been received by said reception section, writes the received data into said sharing storage section.

4. A data delivery apparatus as claimed in claim 3 wherein, when data to be transmitted from a terminal apparatus to another terminal apparatus has been received by said reception section, said dynamic write control section determines whether the attribute data corresponding to the identifier stored in said member storage section in association with a communication address of a terminal apparatus having transmitted the data is indicative of the attribute of an instructor, and that, if it has been determined that the attribute data is indicative of the attribute of an instructor, writes the received data into said sharing storage section.

5. A data delivery apparatus as claimed in claim 1 wherein the requested training material data is delivered by being read out from a database provided in said data delivery apparatus.

6. A method for delivering data to terminal apparatus in a system for music training, said system comprising a data delivery apparatus for performing said method and an instructor terminal apparatus and a plurality of student terminal apparatus connected via a communication network to the data delivery apparatus, said data delivery apparatus including a member table that, for each of members of a group, stores an identifier for identifying the member and attribute data indicative of an attribute of the member and a data-writable sharing storage section that stores data to be shared among all of terminal apparatus of the group, said method comprising;

a step of receiving, via the network, data or command transmitted from any one of said terminal apparatus;

a step of, when data of an identifier transmitted from a terminal apparatus has been received by said step of receiving, writing a communication address of the terminal apparatus, having transmitted the identifier, into said member table in association with the stored identifier identical with the received identifier;

a step of, when a command requesting delivery of training material data has been received by said reception section, determining whether the attribute data corresponding to the identifier stored in said member table in association with a communication address of a terminal apparatus having transmitted the command is indicative of an attribute of an instructor, and that, if it has been determined that the attribute data is indicative of the attribute of an instructor, writing the requested training material data into said sharing storage section, and transmitting, via the network, the particular requested training material data to all of the terminal apparatus of the group having respective communication addresses thereof stored in said member table, wherein the training material data to be written into said sharing storage section includes not only training stationary data pre-stored in the data delivery apparatus but also dynamic data generated in response to an action of the instructor or a student; and a step of, when an identifier transmitted from any one of the student terminal apparatus that has just now logged into said music training system has been received by said reception section and a communication address corresponding to the received identifier has been written into said member storage section by said step of writing, determining whether any data is currently stored in said sharing storage section, and, if it has been determined that training material data is currently stored in said sharing storage section, transmitting the data stored in said sharing storage section to the student terminal apparatus having the communication address corresponding to the received identifier, so that same training material data as training material data, including the stationary data and the dynamic data, stored in any other of the student terminals having already logged in said music training system is stored into the student terminal apparatus having just now logged into said music training system.

7. A computer memory containing a group of instructions for causing a computer to perform a method for delivering data to terminal apparatus in a system for music training, said system comprising a data delivery apparatus for performing said method and an instructor terminal apparatus and a plurality of student terminal apparatus connected via a communication network to the data delivery apparatus, said data delivery apparatus including a member table that, for each of members of a group, stores an identifier for identifying the member and attribute data indicative of an attribute of the member and a data-writable sharing storage section that stores data to be shared among all of terminal apparatus of the group, said method comprising;

a step of receiving, via the network, data or command transmitted from any one of said terminal apparatus;

a step of, when data of an identifier transmitted from a terminal apparatus has been received by said step of receiving, writing a communication address of the terminal apparatus, having transmitted the identifier, into said member table in association with the stored identifier identical with the received identifier;

a step of, when a command requesting delivery of training material data has been received by said reception section, determining whether the attribute data corresponding to the identifier stored in said member table in association with a communication address of a terminal apparatus having transmitted the command is indicative of an attribute of an instructor, and that, if it has been determined that the attribute data is indicative of the attribute of an instructor, writing the requested training material data into said sharing storage section, and transmitting, via the network, the particular requested training material data to all of the terminal apparatus of the group having respective communication addresses thereof stored in said member table, wherein the training material data to be written into said sharing storage section includes not only training stationary data pre-stored in the data delivery apparatus but also dynamic data generated in response to an action of the instructor or a student; and a step of, when an identifier transmitted from any one of the student terminal apparatus that has just now logged into said music training system has been received by said reception section and a communication address corresponding to the received identifier has been written into said member storage section by said step of writing, determining whether any data is currently stored in said sharing storage section, and, if it has been determined that training material data is currently stored in said sharing storage section, transmitting the training material data stored in said sharing storage section to the terminal apparatus having the communication address corresponding to the received identifier, so that same training material data as training material data, including the stationary data and the dynamic data, stored in any other of the student terminals having already logged in said music training system is stored into the student terminal apparatus having just now logged into said music training system.

* * * * *